United States Patent
Hsu et al.

(10) Patent No.: US 11,003,289 B1
(45) Date of Patent: May 11, 2021

(54) FLEXIBLE TOUCH SENSOR PANEL

(71) Applicant: Apple Inc., Cupertino, CA (US)

(72) Inventors: Yung-Yu Hsu, San Jose, CA (US);
Mingjing Ha, Cupertino, CA (US);
Paul S. Drzaic, Morgan Hill, CA (US);
David W. Lum, Cupertino, CA (US);
Bryce T. Bradford, Cupertino, CA (US); Shubham Gandhi, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/563,798

(22) Filed: Sep. 6, 2019

Related U.S. Application Data

(60) Provisional application No. 62/735,751, filed on Sep. 24, 2018.

(51) Int. Cl.
*G06F 3/044* (2006.01)
*G02F 1/1333* (2006.01)
(Continued)

(52) U.S. Cl.
CPC .......... *G06F 3/044* (2013.01); *G02F 1/13338* (2013.01); *G06F 1/1652* (2013.01);
(Continued)

(58) Field of Classification Search
CPC .. G06F 1/1652; G06F 3/0412; G06F 1/13338; G06F 2203/04102;
(Continued)

(56) References Cited

U.S. PATENT DOCUMENTS 4,604,509 A    8/1986  Clancy et al.
4,712,092 A   12/1987  Boldridge et al.
(Continued)

FOREIGN PATENT DOCUMENTS

CN    101203821 A    6/2008
CN    203102155 U    7/2013
(Continued)

OTHER PUBLICATIONS

Non-Final Office Action received for U.S. Appl. No. 16/147,384, dated Oct. 18, 2019, 19 pages.
(Continued)

*Primary Examiner* — Roberto W Flores
(74) *Attorney, Agent, or Firm* — Kubota & Basol LLP

(57) ABSTRACT

Flexible touch sensor panels can be implemented on a strap of a wearable device. A flexible touch sensor panel can provide an additional touch sensitive surface for a user to activate functions on the wearable device without covering a touch screen of the wearable device. In some examples, the flexible touch sensor panels can include electrode connectors configured to electrically couple touch electrodes of the flexible touch sensor panel. In some examples, the electrode connectors can have a serpentine routing pattern configured to allow the touch electrodes to move closer together or farther apart while maintaining electrical coupling between the touch electrodes. In some examples, the touch electrodes can have gaps configured to allow light to pass through the gaps. In some examples, an LED panel can be formed below or one or more waveguide layers can be formed above the flexible touch sensor panel.

25 Claims, 9 Drawing Sheets

(51) Int. Cl.
  *G06F 1/16* (2006.01)
  *G06F 3/041* (2006.01)
  *H04M 1/02* (2006.01)
  *G09F 9/30* (2006.01)

(52) U.S. Cl.
  CPC ............ *G06F 3/0412* (2013.01); *G09F 9/301* (2013.01); *H04M 1/0268* (2013.01); *G06F 2203/04102* (2013.01); *G06F 2203/04103* (2013.01); *H04M 2250/22* (2013.01)

(58) Field of Classification Search
  CPC ... G06F 2203/04103; G06F 3/041–047; G06F 3/044–0448; G06F 2203/04111; G06F 2203/0403; G09F 9/301; H04M 1/0268; H04M 2250/22
  See application file for complete search history.

(56) References Cited

U.S. PATENT DOCUMENTS

| | | |
|---|---|---|
| 4,857,683 A | 8/1989 | Maser |
| 4,857,684 A | 8/1989 | Gratke |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 7,978,181 B2 | 7/2011 | Westerman |
| 8,373,664 B2 | 2/2013 | Wright |
| 8,479,122 B2 | 7/2013 | Hotelling et al. |
| 8,619,363 B1* | 12/2013 | Coleman ............. G02B 5/0242 |
| | | 359/576 |
| 9,148,142 B2 | 9/2015 | Hu |
| 9,164,612 B2 | 10/2015 | Chae |
| 9,229,600 B2 | 1/2016 | Schmid |
| 9,788,789 B2 | 10/2017 | Bailey |
| 9,830,783 B1 | 11/2017 | Kessler et al. |
| 10,372,246 B2 | 8/2019 | Wang |
| 2002/0171518 A1 | 11/2002 | Hsu et al. |
| 2003/0160712 A1 | 8/2003 | Levy |
| 2004/0090417 A1 | 5/2004 | Amiri |
| 2004/0206615 A1 | 10/2004 | Aisenbrey |
| 2005/0104867 A1 | 5/2005 | Westerman et al. |
| 2005/0162389 A1 | 7/2005 | Obermeyer et al. |
| 2005/0218397 A1 | 10/2005 | Tran |
| 2005/0230822 A1 | 10/2005 | Tran |
| 2006/0152499 A1 | 7/2006 | Roberts |
| 2006/0180450 A1 | 8/2006 | Clark et al. |
| 2006/0197753 A1 | 9/2006 | Hotelling |
| 2007/0257821 A1 | 11/2007 | Son et al. |
| 2008/0050550 A1 | 2/2008 | Orth |
| 2008/0092087 A1 | 4/2008 | Brown et al. |
| 2008/0156624 A1 | 7/2008 | Kim et al. |
| 2008/0246739 A1 | 10/2008 | Choi et al. |
| 2009/0008234 A1 | 1/2009 | Tolbert et al. |
| 2009/0058687 A1 | 3/2009 | Rothkopf et al. |
| 2009/0073127 A1 | 3/2009 | Amiri |
| 2009/0251384 A1 | 10/2009 | Ligtenberg et al. |
| 2010/0002402 A1 | 1/2010 | Rogers et al. |
| 2010/0148995 A1 | 6/2010 | Elias |
| 2010/0149127 A1 | 6/2010 | Fisher et al. |
| 2010/0321310 A1* | 12/2010 | Kim ..................... G06F 3/0412 |
| | | 345/173 |
| 2011/0024275 A1 | 2/2011 | Aisenbrey |
| 2011/0203912 A1 | 8/2011 | Niu |
| 2011/0298718 A1 | 12/2011 | Chang et al. |
| 2012/0043191 A1 | 2/2012 | Kessler et al. |
| 2012/0092279 A1 | 4/2012 | Martin |
| 2012/0092293 A1 | 4/2012 | Ganapathi et al. |
| 2012/0099264 A1 | 4/2012 | Degner et al. |
| 2012/0255762 A1 | 10/2012 | Katagiri et al. |
| 2012/0299175 A1 | 11/2012 | Tran |
| 2013/0038578 A1 | 2/2013 | Liang et al. |
| 2013/0063285 A1 | 3/2013 | Elias |
| 2014/0139455 A1 | 5/2014 | Argiro |
| 2014/0168100 A1 | 6/2014 | Argiro |
| 2014/0340857 A1* | 11/2014 | Hsu ..................... A61B 5/6846 |
| | | 361/749 |
| 2015/0090573 A1 | 4/2015 | Mansky et al. |
| 2015/0123569 A1* | 5/2015 | Knaapen ............. F21V 23/0485 |
| | | 315/297 |
| 2015/0185911 A1 | 7/2015 | Kim |
| 2015/0378391 A1* | 12/2015 | Huitema .............. H05K 5/0017 |
| | | 361/679.03 |
| 2016/0030835 A1 | 2/2016 | Argiro |
| 2017/0153726 A1* | 6/2017 | Lee ......................... G06F 3/044 |
| 2017/0249033 A1 | 8/2017 | Podhajny et al. |
| 2017/0265780 A1 | 9/2017 | Lee et al. |
| 2017/0325518 A1 | 11/2017 | Poupyrev et al. |
| 2017/0351341 A1 | 12/2017 | Norwalk et al. |
| 2019/0326361 A1* | 10/2019 | Gwon ................. G06F 3/04164 |
| 2020/0103981 A1 | 4/2020 | Hsu et al. |

FOREIGN PATENT DOCUMENTS

| | | |
|---|---|---|
| CN | 107407973 A | 11/2017 |
| EP | 2284646 A1 | 2/2011 |
| JP | 2000-163031 A | 6/2000 |
| JP | 2002-342033 A | 11/2002 |
| WO | 2017/056005 A1 | 4/2017 |

OTHER PUBLICATIONS

Notice of Allowance received for U.S. Appl. No. 16/147,384, dated Apr. 4, 2020, 8 pages.

Camacho et al., "Designing Touch Sensing Electrodes: Electrical Considerations and Recommended Layout", Freescale Semiconductor, Document No. AN3863, Rev. 4, Jul. 2011, 28 pages.

Lee et al., "A Multi-Touch Three Dimensional Touch-Sensitive Tablet", CHI'85 Proceedings, Apr. 1985, pp. 21-25.

Rubine, Dean, "Combining Gestures and Direct Manipulation", CHI'92, May 3-7, 1992, pp. 659-660.

Rubine, Dean H. , "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

FLEXIBLE TOUCH SENSOR PANEL

CROSS REFERENCE TO RELATED APPLICATIONS

This application claims the benefit under 35 USC 119(e) of U.S. Provisional Patent Application No. 62/735,751, filed Sep. 24, 2018 the content of which is incorporated herein by reference in its entirety for all purposes.

FIELD OF THE DISCLOSURE

This relates generally to touch sensor panels, and more particularly to touch sensor panels having touch electrodes and electrode connectors configured to allow the electrodes to flexibly move while maintaining electrical coupling.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

Examples of the disclosure are directed to various flexible touch sensor panel architectures in which electrode connectors that couple respective touch electrodes can be patterned in a shape which allows the respective electrodes to flexibly move towards or away from each other while maintaining the electrical coupling between the respective electrodes. In some examples, the electrode connectors can be in the same layer or in different layers as the touch electrodes. In some examples, the touch electrodes can have a gap in the electrode to allow light to pass through (e.g., in the case of a touch sensor panel overlaid on a display). In some examples, an LED array can be layered below the touch sensor panel. In some examples, a waveguide can be layered above the touch sensor panel. The disclosed flexible touch sensor panel designs can improve the flexibility of the touch sensor panels.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Examples of the disclosure are directed to various flexible touch sensor panel architectures in which electrode connectors that couple respective touch electrodes can be patterned in a shape which allows the respective electrodes to flexibly move towards or away from each other while maintaining the electrical coupling between the respective electrodes. In some examples, the electrode connectors can be in the same layer or in different layers as the touch electrodes. In some examples, the touch electrodes can have a gap in the electrode to allow light to pass through (e.g., in the case of a touch sensor panel overlaid on a display). In some examples, an LED array can be layered below the touch sensor panel. In some examples, a waveguide can be layered above the touch sensor panel. The disclosed flexible touch sensor panel designs can improve the flexibility of the touch sensor panels.

Figure 1:
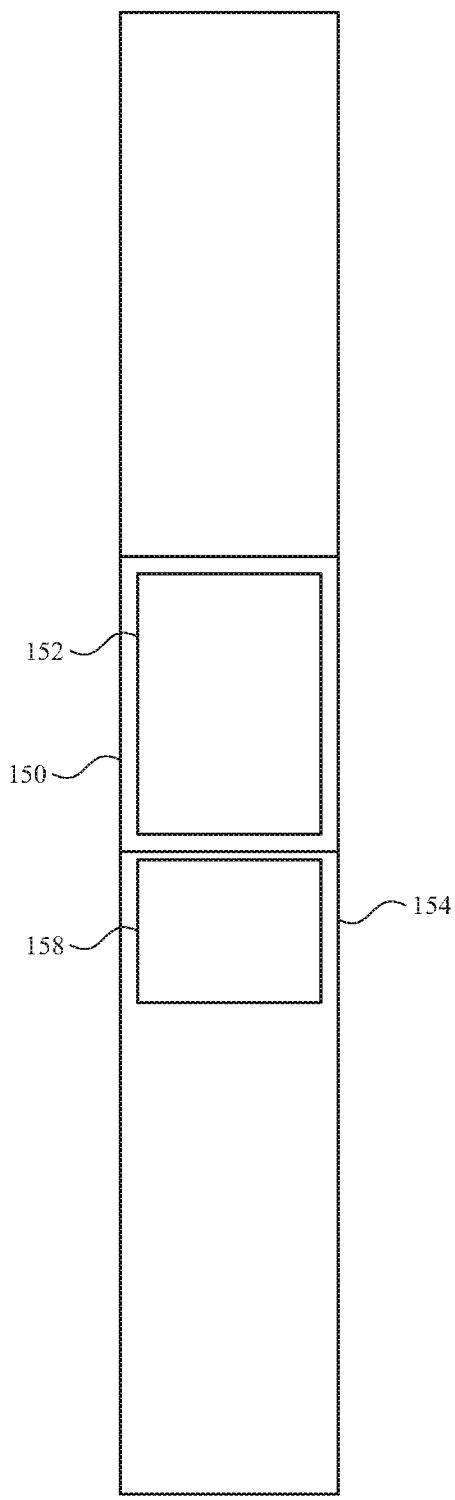
FIG. 1 illustrates an example system in which flexible touch sensor panels according to examples of the disclosure may be implemented.

FIG. 1 illustrates an example system in which flexible touch sensor panels according to examples of the disclosure may be implemented. FIG. 1 illustrates an example wearable device 150 (e.g., a watch) that includes an integrated touch screen 152, strap 154 (e.g., watch band), and flexible touch sensor panel 158 built into strap 154. In some examples, strap 154 (e.g., watch band) or a part of strap 154 can be a flexible material such as elastomer, rubber, plastic, fabric, leather, metal, or any other flexible material suitable for a wearable device strap. In some examples, flexible touch sensor panel 158 can be implemented on a flexible material. In some examples, flexible touch sensor panel 158 can be implemented on or in strap 154 of wearable device 150. In some examples, flexible touch sensor panel 158 can be formed at a location on strap 154 near integrated touch screen 152. In some examples, implementing flexible touch sensor panel 158 on strap 154 can allow a user to interact with wearable device 150 without covering or otherwise impeding the view of integrated touch screen 152 while interacting with the device. In some examples, flexible touch sensor panel 158 can have the same or similar flexibility as strap 154. It is understood that the above flexible touch sensor panel can be implemented in other devices as well, including mobile telephones, digital media players, personal computers, or tablet computers, for example (e.g., on rigid and/or flexible areas of the device and/or on straps, bands and/or other device accessories).

In some examples, touch screen 152 and/or flexible touch sensor panel 158 can be based on self-capacitance. A self-capacitance based touch system can include a matrix of small, individual plates of conductive material that can be referred to as touch node electrodes. For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. In such examples, each touch node electrode can be individually coupled to sense circuitry (circuitry that will be described later) via individual traces—thus, each touch node electrode can be individually addressable by the touch sensing system. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screen 152 and/or flexible touch sensor panel 158 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. In some examples, the electrodes of a mutual-capacitance based touch system can be formed from a matrix of small, individual plates of conductive material, and changes in the mutual capacitance between plates of conductive material can be detected, similar to above.

In some examples, touch screen 152 and/or flexible touch sensor panel 158 can be based on mutual capacitance and/or self-capacitance. The electrodes can be arrange as a matrix of small, individual plates of conductive material or as drive lines and sense lines, or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
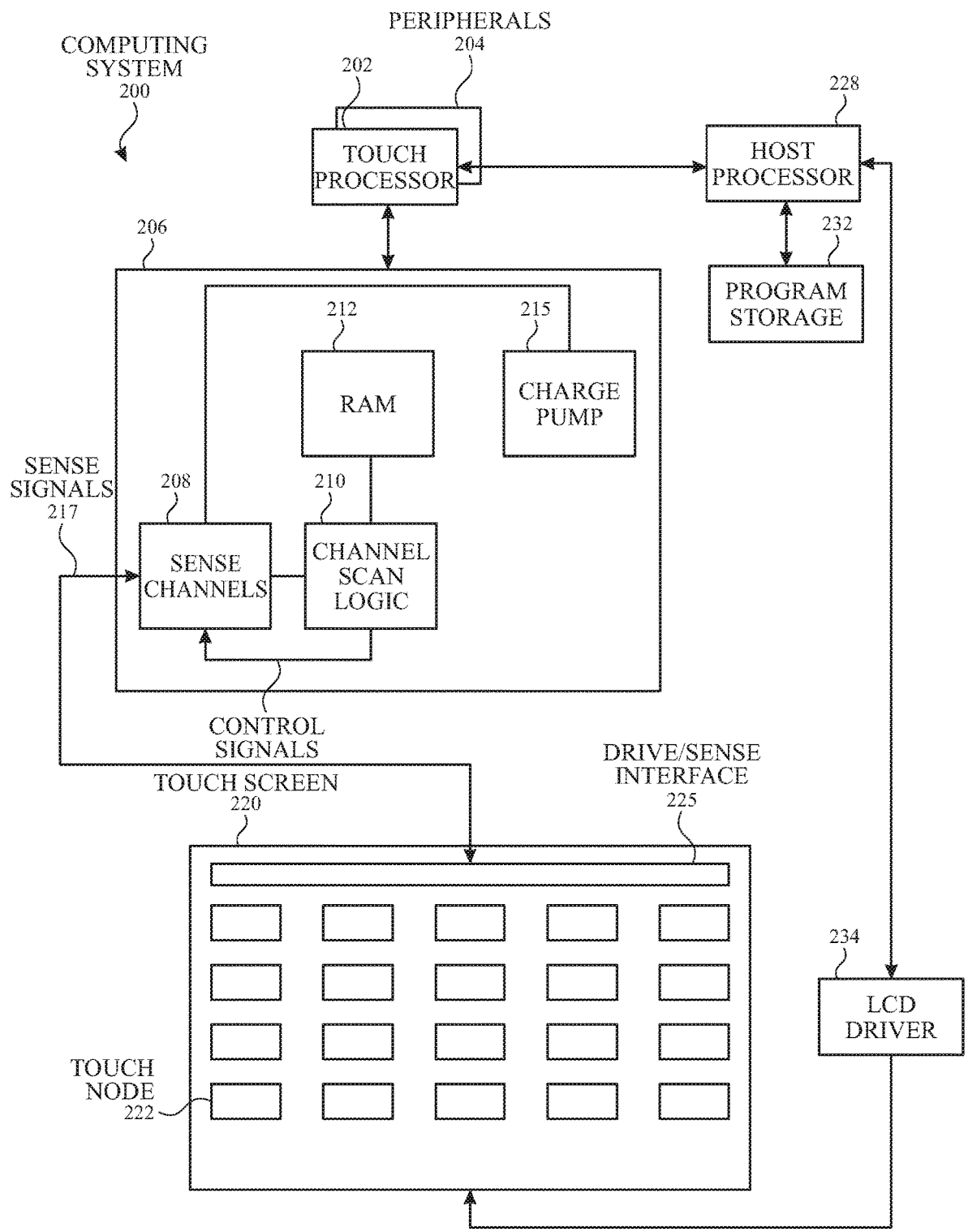
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. It is understood that computing system 200 can include a self-capacitance touch screen or a mutual capacitance touch screen, as described above. Computing system 200 can be included in, for example, wearable device 150 or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In some examples, RAM 212 can contain various configuration information for specific touch screen 220 scans performed by channel scan logic 210 (e.g., scan specific configuration information for sense channels 208), can receive and/or store touch data from sense channels 208, and can be managed by channel scan logic 210. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. As used herein, an electrical component "coupled to" or "connected to" another electrical component encompasses a direct or indirect connection providing electrical path for communication or operation between the coupled components. Thus, for example, touch node electrodes 222 may be directly connected to sense channels or indirectly connected to sense channels via drive/sense interface 225, but in either case provided an electrical path for driving and/or sensing the touch node electrodes 222. In some examples, drive/sense interface 225 can be implemented in the touch controller 206, or can be implemented in a chip separate from touch controller 206. Additional exemplary details of how drive/sense interface 225 can be implemented can be found in U.S. patent application Ser. No. 15/009,774, filed Jan. 28, 2016, entitled "Flexible Self Capacitance and Mutual Capacitance Touch Sensing System Architecture," the entire contents of which is hereby incorporated by reference for all purposes. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

It is understood that touch screen 220 described herein can correspond to touch screen 152 (e.g., on the body of wearable device 150) and/or flexible touch sensor panel 158 (e.g., on the strap of wearable device 150). For example, wearable device 150 can include two instances of computing system 200: one corresponding to touch screen 152 and one corresponding to flexible touch sensor panel 158 (e.g., each computing system controls its own touch element). In some examples, wearable device 150 can include one instance of computing system 200 that controls two instances of touch screen 220: one corresponding to touch screen 152 and one corresponding to flexible touch sensor panel 158 (e.g., a single computing system can control both touch elements). In such examples, both instances of touch screen 220 can receive sense signals and/or provide sensor signals to/from touch controller 206. In some examples, display driver 234 can drive displays on touch screen 152 and optionally the LED panels and/or waveguide layers described below with respect to FIGS. 8 and 9. In some examples, all elements of computing system 200 can be implemented in wearable device 150 except for touch screen 220 (e.g. corresponding to flexible touch sensor panel 158, which is implemented on strap 154 of wearable device 150. In such examples, touch screen 220 can send and receive sense signals and/or LCD driver signals via electrical connectors routed from flexible touch sensor panel 158 on strap 154 to wearable device 150 (e.g., where the rest of computing system 200 resides). In some examples (such as in the case of two instances of computing system 200), computing system 200 can be implemented in strap 154 of wearable device 150 (e.g., to control flexible touch sensor panel 158). Thus, flexible touch sensor panel 158 can be controlled by the same or similar components in a similar way as touch screen 152.

Computing system 200 can also include a host processor 228 for receiving outputs from touch processor 202 and performing actions based on the outputs. For example, host processor 228 can be connected to program storage 232 and a display controller, such as a display driver 234 (e.g., for controlling operation of a display, such as an LCD display, an OLED display, etc.). The display driver 234 can provide voltages on select (e.g., gate) lines to each pixel transistor and can provide data signals along data lines to these same transistors to control the pixel display image as described in more detail below. Host processor 228 can use display driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
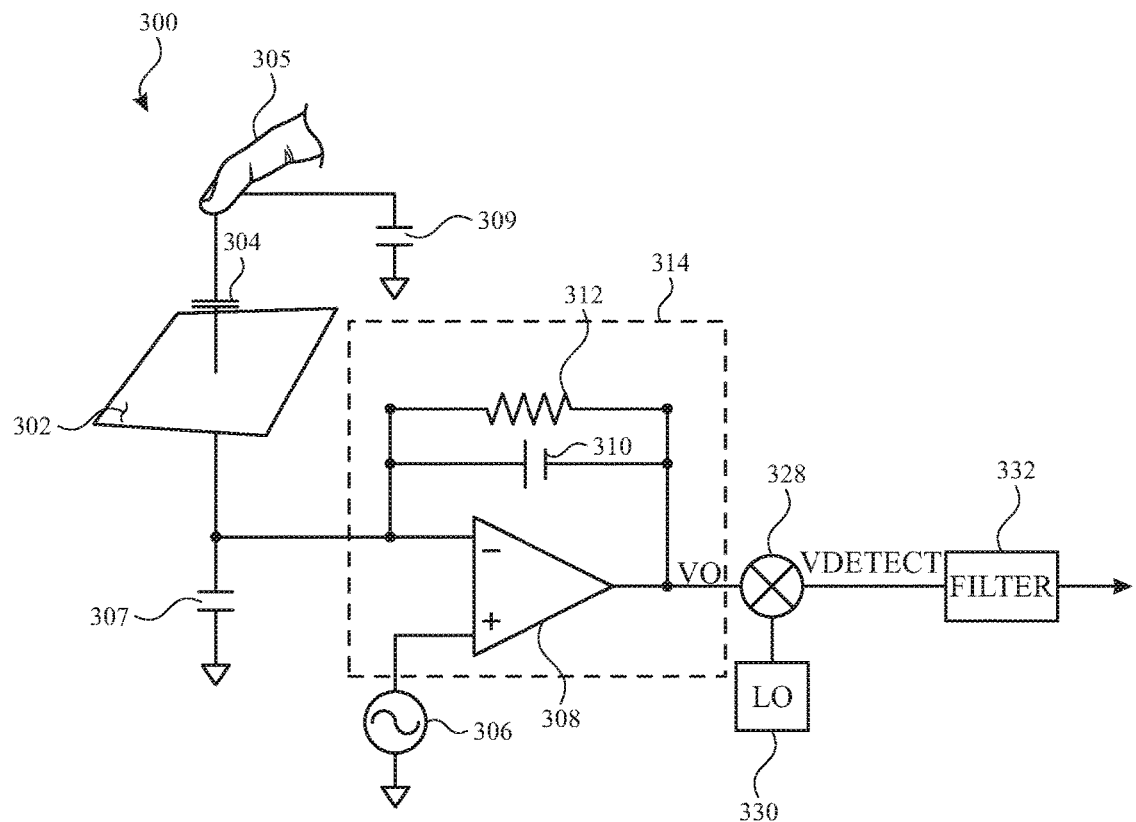
FIGS. 3A-3B illustrate exemplary touch sensor circuits according to examples of the disclosure.
Figure 3B:
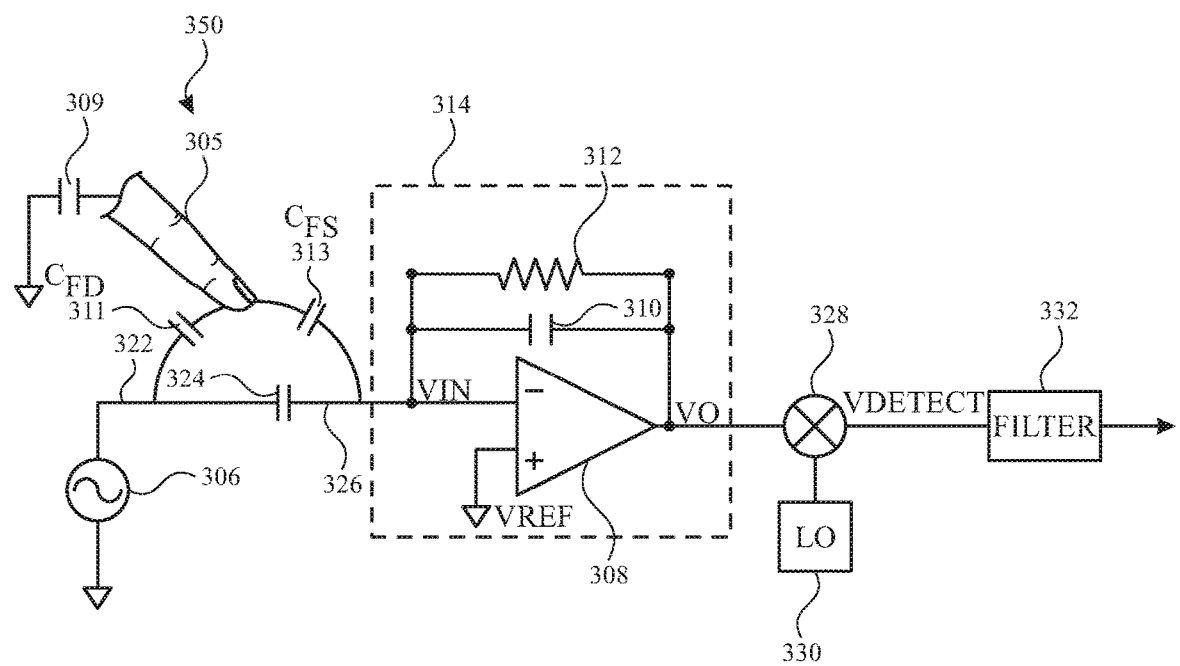

FIGS. 3A-3B illustrate exemplary touch sensor circuits according to examples of the disclosure. FIG. 3A illustrates an exemplary touch sensor circuit 300 for performing a self-capacitance measurement using an electrode (e.g., a self-capacitance touch node electrode 302) and sensing circuit 314 according to examples of the disclosure. Sensing circuit 314 can be included in sense channels 208 to sense the self-capacitance of one or more touch electrodes on the touch sensor panels/touch screens of the disclosure. Touch node electrode 302 can correspond to a self-capacitance touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance C 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC stimulation source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

FIG. 3B illustrates an exemplary touch sensor circuit 350 for performing a mutual capacitance measurement using two electrodes (a mutual capacitance drive electrode 322 and sense electrode 326, such as the column electrodes and row electrodes described previously) and sensing circuit 314 according to examples of the disclosure. A stimulation signal can be generated by sense channels 208 (e.g., sense channels 208 can include an AC stimulation source 306 and have drive capabilities), drive electrode 322 can correspond to column electrode 223, sense electrode 326 can correspond to row electrode 224, and sensing circuit 314 can be included in sense channels 208. Drive electrode 322 can be stimulated by a stimulation signal (e.g., an AC voltage signal). A stimulation signal can be capacitively coupled to sense electrode 326 through mutual capacitance 324 between drive electrode 322 and sense electrode 326. When a finger 35 or object approaches the touch node created by the intersection of drive electrode 322 and sense electrode 326, mutual capacitance 324 can be altered. The intersection of drive electrode 322 and sense electrode 326 can correspond to a mutual capacitance touch node. This change in mutual capacitance 324 can be detected to indicate a touch or proximity event at the touch node, as described previously and below. The sense signal coupled onto electrode 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4:
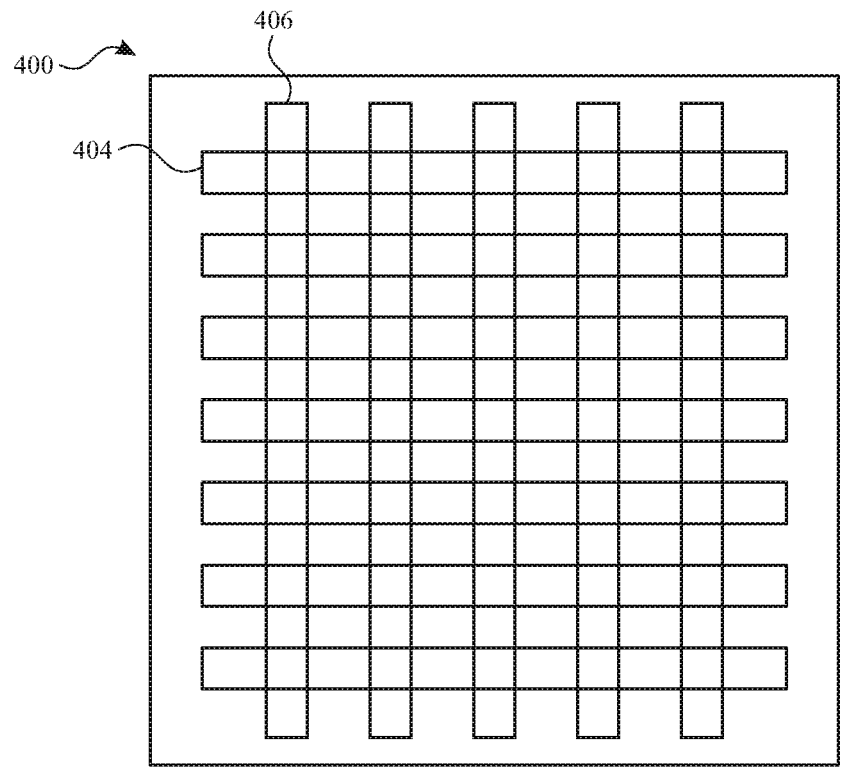
FIG. 4 illustrates touch sensor panel with drive lines and sense lines arranged in rows and columns, respectively, according to examples of the disclosure.

FIG. 4 illustrates touch sensor panel 400 with drive lines 406 and sense lines 404 arranged in rows and columns, respectively, according to examples of the disclosure. In some examples, sense lines can be arranged in columns and drive lines can be arranged in rows. Specifically, touch sensor panel 400 can include one or more touch electrodes disposed as columns that form drive lines (e.g., single contiguous electrodes, or noncontiguous electrodes electrically coupled together using electrical bridges), and one or more touch electrodes disposed as rows that form sense lines (e.g., single contiguous electrodes, or noncontiguous electrodes electrically coupled together using electrical bridges). The touch electrodes can be on the same or different material layers on touch sensor panel 400, and the drive lines 406 and the sense lines 404 and can intersect with each other while remaining electrically isolated from each other, as illustrated in FIG. 4. In some examples, touch sensor panel 400 can sense the self-capacitance of lines 404 and 406 to detect touch and/or proximity activity on touch sensor panel 400, and in some examples, touch screen 400 can sense the mutual capacitance between lines 404 and 406 to detect touch and/or proximity activity on touch sensor panel 400. In some examples, the arrangement of touch sensor panel 400 can be implemented on the flexible touch sensor panels described in the following figures and/or touch screens in FIGS. 1 and 2.

In some examples, it is desired to integrate touch sensor functionality onto a flexible or elastic material. For example, a touch sensor panel can be integrated into the strap of a wearable device. In such an example, the strap of the wearable device can experience stretching, bending, twisting, or other mechanical forces as a result of ordinary usage and/or conforming to the size and shape of a user's wrist while wearing the wearable device. Conventional touch sensor panels may not have the same flexibility as the strap of the wearable device and/or may not conform to the flexibility requirements for integration onto the strap of the wearable device. Thus, it is desired to have a flexible touch sensor panel that can have more flexibility than conventional touch sensor panels. Integration of a flexible touch sensor panel onto the strap of a wearable device can increase the functionality of the device by providing further surfaces for a user to activate functions on the wearable device (e.g., without covering a touch screen of the wearable device).

Figure 5A:
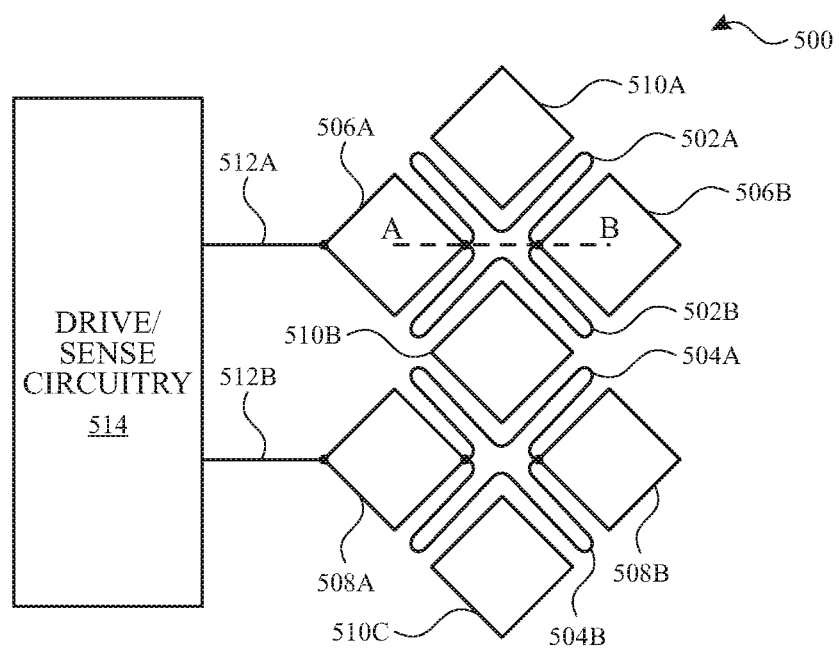
FIGS. 5A-5C illustrate exemplary flexible touch sensor panels including flexible electrode connectors according to examples of the disclosure.

FIG. 5A illustrates an exemplary flexible touch sensor panel 500 including flexible electrode connectors 502A-B and 504A-B according to examples of the disclosure. In some examples, flexible touch sensor panel 500 can include rows and columns of touch electrodes (e.g., similar to touch screen 400). In some examples, the touch electrodes can be arranged to have a diamond-like shape. In some examples, the touch electrodes can be arranged to have a square-like shape or any other shape. As illustrated in FIG. 5A, touch electrodes 506A and 506B can comprise one row of touch electrodes, touch electrodes 508A and 508B can comprise a second row of touch electrodes, and touch electrodes 510A, 510B, and 510C can comprise a column of touch electrodes. In some examples, more or fewer touch electrodes can comprise a row or column of electrodes. In some examples, a column of touch electrodes can be configured as drive electrodes. In some examples, a row of touch electrodes can be configured to be sense electrodes. In some examples, a column of touch electrodes can be configured as sense electrodes and a row of touch electrodes can be configured as drive electrodes. In some examples, the touch electrodes can be configured as pixelated self-capacitance electrodes. For ease of description, FIG. 5A focuses on the arrangement of the flexible electrode connectors for the row electrodes; connectors for the column electrodes are not illustrated. In some examples, the column electrodes can be connected using flexible electrode connectors similar to the flexible electrode connectors described below with respect to FIG. 5C and/or FIG. 7.

In some examples, as shown in FIG. 5A, a row of touch electrodes can be electrically coupled by flexible electrode connectors. For example, touch electrode 506A can be electrically coupled to touch electrode 506B via flexible electrode connectors 502A and 502B. In some examples, flexible electrode connectors 502A and 502B can be a flexible metal trace. In some examples, the touch electrodes can be a rigid material, a semi-rigid material, or otherwise more rigid than the flexible electrode connectors. In some examples, flexible electrode connectors 502A and 502B can be routed in parallel to provide two parallel electrical connections between touch electrodes 506A and 506B. In some examples, having two parallel connectors can provide mechanical stability while flexible touch sensor panel 500 is flexing or otherwise experiencing mechanical pressure. In some examples, a single flexible electrode connector can be used to electrically couple touch electrodes 506A and 506B.

As shown in FIG. 5A, flexible electrode connector 502A and 502B can couple to a corner of touch electrode 506A and touch electrode 506B. In some examples, the routing of flexible electrode connector 502B can be a reflection of flexible electrode connector 502A across an axis (e.g., the horizontal axis). The routing of flexible electrode connectors 502A and 502B described herein can be implemented on flexible touch sensor panel 540 (described below in FIG. 5C) to electrically couple the row electrodes (e.g., 506A and 506B and/or 508A and 508B).

In some examples, flexible electrode connectors 502A and 502B can have a routing pattern which allows touch electrodes 506A and 506B to move closer together or farther away from each other while maintaining electrical coupling and connectivity (e.g., without breaking the flexible electrode connectors or otherwise disconnecting the electrical connection). In some examples, flexible electrode connector 502A and 502B can have a serpentine routing pattern or a butterfly routing pattern. In some examples, flexible electrode connector 502A and 502B can have other routing patterns, including zigzags, meanders, loops, a series of buckles, or any other suitable routing pattern allows stretching or twisting of the flexible electrode connector while maintaining electrical coupling and connectivity. For example, starting from a corner of touch electrode 506A (e.g., electrically and mechanically coupled to touch electrode 506A at that corner), flexible electrode connector 502A can first route diagonally in an upward-leftward direction (e.g., diagonally away from touch electrode 506B), parallel to the upper-right edge of touch electrode 506A. When flexible electrode connector 502A reaches the top corner or approaches the upper-left edge of touch electrode 506A, flexible electrode connector 502A can then loop back and route diagonally in a downward-rightward direction (diagonally towards touch electrode 506B). In some examples, flexible electrode connector 502A can loop back before reaching the upper-left edge of touch electrode 506A. In some examples, flexible electrode connector 502A can be routed closer to the center of the gaps between the touch electrodes (e.g., equidistant from the touch electrodes). In some examples, routing closer to the center of the gaps can allow flexible electrode connector 502A to coincide with the flexible routing patterns described in FIG. 5C (e.g., which can be routed closer to the edge of the gaps between electrodes) without unintended electrical or mechanical coupling. When flexible electrode connector 502A reaches or passes the vertical axis of touch electrode 510A (e.g., the column electrode to which flexible electrode connector 502A does not connect), flexible electrode connector 502A can route diagonally in the upper-right direction (e.g., parallel to the upper-left edge of touch electrode 506B). Thus, flexible electrode connector 502A can partially traverse the gap between touch electrodes 506A and 510A (e.g., in the gap and/or along the gap between the two adjacent electrodes). When flexible electrode connector 502A reaches the top corner or approaches the upper-right edge of touch electrode 506B, flexible electrode connector 502A can then loop back and route diagonally in a downward-leftward direction (e.g., parallel to touch electrode 506B, but in the opposite direction as previously). In some examples, flexible electrode connector 502A can loop back before reaching the upper-right edge of touch electrode 506B. In some examples, flexible electrode connector 502A can then couple to a corner of touch electrode 506B (e.g., electrically and mechanically coupled to touch electrode 506B at that corner). Thus, flexible electrode connector 502A can partially traverse the gap between touch electrodes 510A and 506B

(e.g., in the gap and/or along the gap between the two adjacent electrodes). As will be described in more detail below, in some examples, flexible electrode connector 502A can be routed on the same layer as touch electrodes 506A and 506B. In some examples, flexible electrode connector 502A can be routed in a different layer as touch electrodes 506A and 506B. In some examples, a portion of flexible electrode connector 502A can be routed on the same layer as touch electrodes 506A and 506B and a portion of flexible electrode connector 502A can be routed on a different layer as touch electrodes 506A and 506B. Although FIG. 5A illustrates flexible electrode connector 502A electrically coupling to corners of touch electrodes 506A and 506B, it is understood that the flexible electrode connectors can be connected along the edges of the respective touch electrodes, similar to that described below with respect to FIG. 5C.

In some examples, the serpentine routing pattern described above can allow flexible electrode connector 502A to flex, bend, or otherwise change its shape in response to touch electrodes 506A and 506B moving closer together or farther away from each other while maintaining electrical connectivity (e.g., electrical coupling), as will be described below with reference to FIG. 5B. In some examples, when flexible touch sensor panel 500 is not experiencing bending, flexing, twisting, or other mechanical forces, the shape of flexible electrode connector 502A can return to the above-described routing pattern (e.g., resting or equilibrium shape). For example, the serpentine routing pattern (or the material of flexible electrode connector 502A in combination with the serpentine routing pattern) can allow flexible electrode connector 502A to return to its resting (equilibrium) position and/or can exert a mechanical force on touch electrodes 506A and/or 506B to return the touch electrodes back to their resting (equilibrium) positions and/or to return to their resting (equilibrium) distances with respect to each other and/or other touch electrodes. In some examples, other flexible routing patterns can be used. As described above, flexible electrode connector 502B can have a similar routing pattern, but reflected across the horizontal axis. In some examples, flexible electrode connectors 504A and 504B can have a similar routing pattern as flexible electrode connectors 502A and 502B (e.g., to electrically couple touch electrodes 508A and 508B). Although the serpentine routing pattern described above (including serpentine routing patterns described below with respect to FIG. 5C and FIG. 7) has been described to provide the flexible electrode connector the ability to maintain electrical connectivity in response to touch electrodes moving closer together or farther apart, it is understood that the serpentine routing pattern can allow for any other type of deviation of the touch electrodes from their equilibrium or resting positions, such as twisting, rotating, lifting, or otherwise becoming misaligned and/or having different planes from each other. In some examples, the flexible electrode connectors can comprise one or more layers, including a metallic layer that provides electrical connectivity. In some examples, the one or more layers can comprise a polyimide (PI) layer, which can provide mechanical stability to the flexible electrical connectors when flexing, as will be described in more detail below.

In some examples, flexible touch sensor panel 500 can include drive/sense circuitry 514. In some examples, drive/sense circuitry 514 can include drive/sense interface 225 and can include exemplary touch sensor circuits described above with respect to FIGS. 3A-3B. In some examples, drive/sense circuitry 514 can be electrically coupled to touch electrodes 506A and 508A (e.g., through electrode connectors 512A and 512B, respectively). For example, touch electrode 506A (and/or touch electrode 506B) can correspond to sense electrode 326 and can alter mutual capacitance 324 when a finger (e.g., finger 305) and/or object approaches or contacts the intersection of touch electrode 506A (e.g., in this example, touch electrode 506A-B is configured as sense electrodes) and a drive electrode. In some examples, electrode connectors 512A and 512B can be flexible electrode connectors similar to flexible electrode connectors described above and can have a similar serpentine routing pattern. In some examples, a portion of electrode connectors 512A and 512B can have a serpentine routing pattern and a portion of electrode connectors 512A and 512B can have a different routing pattern. In some examples, drive electrodes (e.g., touch electrodes 510A, 510B, and 510C) can be driven by drive/sense circuitry 514 (connections not shown) and sense electrodes (e.g., touch electrodes 506A and 506B) can be sensed by drive/sense circuitry 514. In some examples, self-capacitance of touch electrodes (e.g., touch electrodes 506A and 508A) can be driven and/or sensed by drive/sense circuitry 514.

As mentioned above, the flexible touch sensor panels of the disclosure can allow for movement of touch electrodes with respect to each other while maintaining electrical connections between those touch electrodes. FIG. 5B illustrates an exemplary flexible touch sensor panel 520 with flexible electrode connectors 502A-B and 504A-B according to examples of the disclosure. Flexible touch sensor panel 520 can be similar to flexible touch sensor panel 500 described above. As illustrated in FIG. 5B, when flexible touch sensor panel 520 is stretched laterally along the horizontal axis, touch electrodes 506A and 506B can become spaced farther apart than when the touch sensor panel is not stretched. Similarly, touch electrodes 508A and 508B are spaced farther apart than when the touch sensor panel is not stretched. In some examples, the stretching can result from the movements of the wearable device while being worn on the wrist of a user (e.g., the watch strap on which flexible touch sensor panel 520 is disposed can flex with these movements). In some examples, the stretching can result from the strap of the wearable device conforming to the curvature of the user's wrist.

When flexible touch sensor panel 520 is stretched, flexible electrode connectors 502A, 502B, 504A, and 504B can still maintain electrical coupling between their respective touch electrodes. In some examples, the flexible electrode connectors can change shape to accommodate the change in distance between the respective touch electrodes. For example, as illustrated in FIG. 5B, the serpentine pattern of flexible electrode connector 502A can be widened and/or expand as the gaps between the touch electrodes expand. In some examples, the angles of flexible electrode connector 502A (e.g., the 180 degree loop-back/hairpin angle between touch electrodes 506A and 510B and touch electrodes 510A and 506B and the 90 degree curve at the lower corner of touch electrode 510A) can be widened to flex with the movement of the touch electrodes (e.g., to an angle greater than 180 degrees and/or greater than 90 degrees, respectively). Thus, segments of flexible electrode connector 502A (e.g., the loop-back segments between touch electrodes 506A and 510B and touch electrodes 510A and 506B) when touch electrodes are moved farther apart can be temporarily bent farther apart than their equilibrium or resting state (e.g., as compared to FIG. 5A). In some examples, the total length of the flexible electrode connectors remains constant (e.g., the flexible electrode connectors are not stretched, but merely change shape). In some examples, the flexible electrode connectors can be stretched to accommodate the change in distance. Although FIG. 5B illustrates flexible touch sensor panel 520 stretching laterally in a horizontal direction, it is understood that flexible touch sensor panel 520 can stretch in any other direction (e.g., vertically, diagonally, etc.) or otherwise deviated from their equilibrium or resting positions and the flexible electrode connector can still maintain the electrical coupling.

Figure 5B:
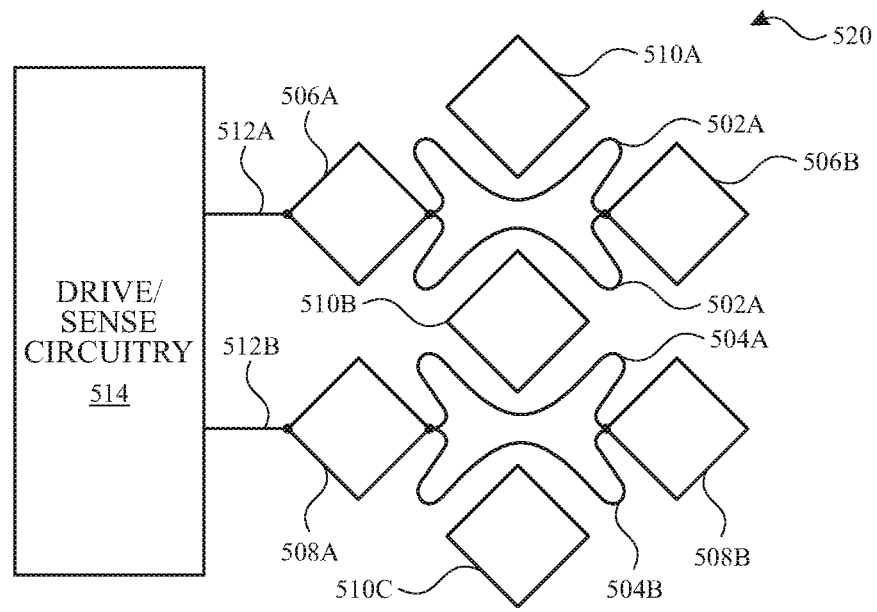
Figure 5C:
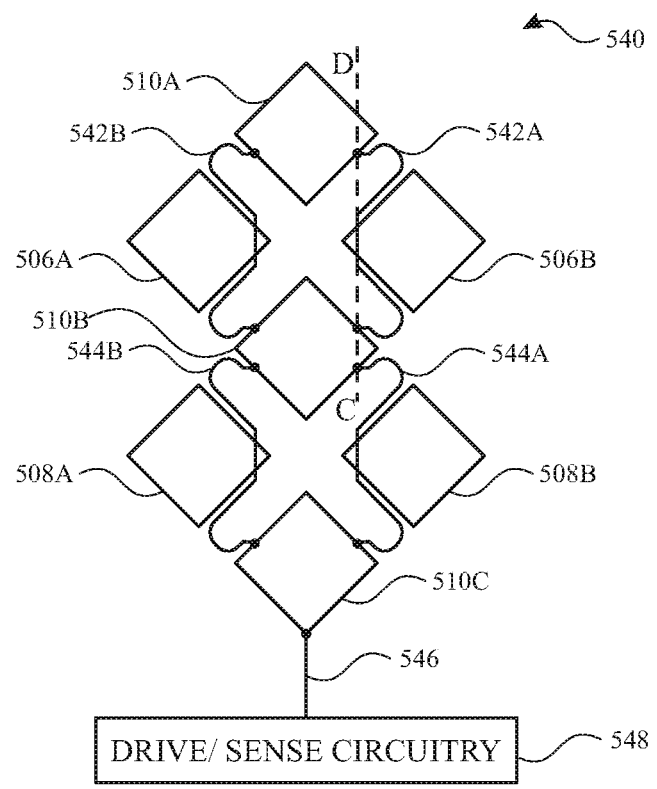

FIG. 5C illustrates an exemplary flexible touch sensor panel 540 with flexible electrode connectors 542A-B and 544A-B according to examples of the disclosure. Similarly to flexible touch sensor panel 500, flexible touch sensor panel 540 can include rows and columns of touch electrodes. For ease of description, FIG. 5C focuses on the arrangement of the flexible electrode connectors for the column electrodes; connectors for the row electrodes are not illustrated. In some examples, connectors for the row electrodes can be similar to the flexible electrode connectors described above with respect to FIGS. 5A-B.

In some examples, as shown in FIG. 5C, a column of touch electrodes can be electrically coupled by flexible electrode connectors. For example, touch electrodes 510A can be electrically coupled to touch electrode 510B via flexible electrode connectors 542A and 542B. In some examples, flexible electrode connectors 542A and 542B can be flexible metal traces. In some examples, the touch electrodes can be a rigid material, a semi-rigid material, or otherwise more rigid than the flexible electrode connector. In some examples, flexible electrode connectors 542A and 542B can be routed in parallel to provide two parallel electrical couplings between touch electrodes 510A and 510B. In some examples, having two parallel connectors can provide mechanical stability while flexible touch sensor panel 540 is flexing or otherwise experiencing mechanical pressure. In some examples, a single flexible electrode connector can be used to electrically couple touch electrodes 510A and 510B. As shown in FIG. 5C, flexible electrode connector 542A and 542B can couple to an edge of touch electrode 510A and touch electrode 510B. In some examples, the routing of flexible electrode connector 542B can be a reflection of flexible electrode connector 502A across an axis (e.g., the vertical axis). The routing of flexible electrode connectors 542A and 542B described herein can be implemented on flexible touch sensor panel 500 and 520 (described above in FIGS. 5A-5B) to electrically couple the column electrodes (e.g., 510A, 510B and 510C).

In some examples, flexible electrode connectors 542A and 542B can have a routing pattern which allows touch electrodes 510A and 510B to move closer together or further apart while maintaining electrical connectivity (e.g., without breaking the flexible electrode connectors or otherwise disconnecting the electrical connection). In some examples, flexible electrode connector 542A and 542B can have a serpentine routing pattern or a butterfly routing pattern. In some examples, flexible electrode connector 542A and 542B can have other routing patterns, including zigzags, meanders, loops, a series of buckles, or any other suitable routing pattern allows stretching or twisting of the flexible electrode connector while maintaining electrical coupling and connectivity. For example, starting from an edge of touch electrode 510A (e.g., electrically and mechanically coupled to touch electrode 510A at that edge), flexible electrode connector 542A can first route diagonally in an upward-rightward direction (e.g., diagonally away from touch electrode 510B), parallel to the lower-right edge of touch electrode 510A. When flexible electrode connector 542A reaches the right corner or approaches the upper-right edge of touch electrode 510A, flexible electrode connector 542A can then loop back and route diagonally in a downward-leftward direction (diagonally towards touch electrode 510B). In some examples, flexible electrode connector 542A can loop back before reaching the upper-right edge of touch electrode 510A. In some examples, flexible electrode connector 542A can be routed closer to the edge of the gaps between the touch electrodes (e.g., closer to the touch electrodes). In some examples, routing closer to the edge of the gaps can allow flexible touch electrode 542A to coincide with the flexible routing patterns described in FIGS. 5A-5B (e.g., which can be routed closer to the center of the gaps between electrodes) without unintended electrical or mechanical coupling. When flexible electrode connector 542A reaches a point that is above the connection point to touch electrode 510B, flexible electrode connector 542A can route downwards (e.g., towards touch electrode 510B) and across touch electrode 506B. In some examples, flexible touch electrode 542A can route downwards and across touch electrode 506B at any point before or after the point directly above the connection point to touch electrode 510B. Thus, flexible electrode connector 542A can partially traverse the gap between touch electrodes 510A and 506B (e.g., in the gap and/or along the gap between the two adjacent electrodes).

In some examples, flexible electrode connector 542A can route in a layer above or in a layer below the layer in which touch electrode 506B is located. In some examples, routing in a different layer can prevent flexible electrode connector 542A from coupling with touch electrode 506B. In some examples, as will be described below, flexible electrode connector 542A can be routed entirely on a different layer than touch electrodes 510A, 506B and 510B and can be coupled to touch electrodes 510A and 510B using vias. As used herein, a via is an element that passes through physical layers in a physical circuit and provides and/or enables electrical connectivity between the layers through which the via passed (e.g., a via can drill down from the top layer of a circuit to the bottom layer of a circuit and electrically couple a component at the top layer to a component on the bottom layer). For example, as illustrated in FIG. 5C, touch electrodes 510A and 510B can be located in a top layer of flexible touch sensor panel 540 (e.g., in a 3 layer stackup) and flexible electrode connector 542A can be located in the bottom layer of flexible touch sensor panel 540 (e.g., in a 3 layer stackup). In such example, a first via can be located within the area of touch electrode 510A, at or near the edge of touch electrode 510A and can provide electrical connectivity from touch electrode 510A in the top layer through the one or more middle layers of flexible touch sensor panel 540 to flexible electrode connector 542A in the bottom layer. In some examples, a second via can be located within the area of touch electrode 510B, at or near the edge of touch electrode 510B and can provide electrical connectivity from touch electrode 510B in the top layer through the one or more middle layers of flexible touch sensor panel 540 to flexible electrode connector 542A in the bottom layer. In some examples, a portion of flexible electrode connector 542A can be in the same layer as touch electrode 510A and 510B (e.g., the areas which do not risk unintentional coupling with other electrodes) and a portion of flexible electrode connector 542A can be routed in a different layer (e.g., the areas which risk unintentional coupling with other electrodes, such as when flexible electrode connector 542A routes across touch electrode 506B). In some examples, vias can be used to route flexible electrode connector 542A to different layers at any point along the serpentine pattern.

Routing the flexible electrode connectors through different layers will be described in further delay below.

Referring back to FIG. 5C, flexible electrode connector 542A can be routed downwards (e.g., towards touch electrode 510B) and across touch electrode 506B (e.g., on a layer different from touch electrode 506B). In some examples, this downward route can be a straight line and need not be routed in a serpentine routing pattern. In such examples, because touch electrode 506B is a more rigid material, serpentine routing may not be necessary when flexible electrode connector 542A is within the area of touch electrode 506B, because flexing within that area can be minimal to non-existent. In some examples, when flexible electrode connector 542A reaches the gap between touch electrode 506B and 510B, flexible electrode connector 542A can resume its serpentine routing pattern and route diagonally in a downward-rightward direction (e.g., parallel to touch electrode 510B). When flexible electrode connector 542A reaches the right corner or approaches the lower-right edge of touch electrode 506B, flexible electrode connector 542A can then loop back and route diagonally in an upward-leftward direction (e.g., parallel to touch electrode 510B, but in the opposite direction as previously). In some examples, flexible electrode connector 542A can loop back before reaching the lower-right edge of touch electrode 506B. As described above, in some examples, flexible electrode connector 542A can be routed closer to the edge of the gaps between the touch electrodes (e.g., closer to the touch electrodes). In some examples, routing closer to the edge of the gaps can allow flexible touch electrode 542A to coincide with the flexible routing patterns described in FIGS. 5A-5B (e.g., which can be routed closer to the center of the gaps between electrodes) without unintended electrical or mechanical coupling. In some examples, flexible electrode connector 542A can then couple to an edge of touch electrode 506B (e.g., electrically and mechanically coupled to touch electrode 506A at that edge). Thus, flexible electrode connector 542A can partially traverse the gap between touch electrodes 506B and 510B (e.g., in the gap and/or along the gap between the two adjacent electrodes). Although FIG. 5C illustrates flexible electrode connector 542A coupling to the edges of touch electrode 510A and 510B, it is understood that the flexible electrode connectors can be connected to the corners of the respective touch electrodes, similar to that described above with respect to FIG. 5A.

In some examples, a serpentine routing pattern described above can allow flexible electrode connector 542A to flex, bend, or otherwise change its shape in response to touch electrodes 510A and 510B moving closer together or farther away from each other. In some examples, when flexible touch sensor panel 500 is not experiencing bending, flexing, twisting, or other mechanical forces, the shape of flexible electrode connector 542A can return to the above-described routing pattern (e.g., resting or equilibrium shape). For example, the serpentine routing pattern (or the material of flexible electrode connector 542A in combination with the serpentine routing pattern) can allow flexible electrode connector 542A to return to its resting (equilibrium) position and/or can exert a mechanical force on touch electrodes 510A and/or 510B to return the touch electrodes back to their resting (equilibrium) positions and/or to return to their resting (equilibrium) distances with respect to each other and/or other touch electrodes. In some examples, other flexible routing patterns can be used. As described above, flexible electrode connector 542B can have a similar routing pattern, but reflected across the vertical axis. In some examples, flexible electrode connectors 544A and 544B can have a similar routing pattern as flexible electrode connectors 542A and 542B (e.g., to electrically couple touch electrodes 510B and 510C). In some examples, the flexible electrode connectors can comprise one or more layers, including a metallic layer that provides electrical connectivity. In some examples, the one or more layers can comprise a polyimide (PI) layer, which can provide mechanical stability to the flexible electrical connectors when flexing, as will be described in more detail below.

In some examples, flexible touch sensor panel 540 can include drive/sense circuitry 548. In some examples, drive/sense circuitry 548 can include drive/sense interface 225 and can include exemplary touch sensor circuits described above with respect to FIGS. 3A-3B. In some examples, drive/sense circuitry 548 can be electrically coupled to touch electrode 510C through electrode connector 546. For example, touch electrode 510C (and/or touch electrodes 510A and 510B) can correspond to drive electrode 322 and alter mutual capacitance 324 when a finger (e.g., finger 305) and/or object approaches or contacts the intersection of touch electrode 510C (e.g., in this example, touch electrode 510A-C is configured as drive electrode) and a sense electrode. In some examples, electrode connector 546 can be flexible electrode connectors similar to flexible electrode connectors described above and can have a similar serpentine routing pattern. In some examples, a portion of electrode connectors 546 can have a serpentine routing pattern and a portion of electrode connector 546 can have a more conventional routing pattern. In some examples, drive/sense circuitry 548 can drive and/or sense the mutual capacitance of the electrodes. In some examples, drive/sense circuitry 548 can be configured to drive and/or sense self-capacitance of the electrodes. In some examples, drive/sense circuitry 548 can include exemplary touch sensor circuits described with respect to FIGS. 3A-3B. In some examples, drive electrodes (e.g., touch electrodes 510A, 510B, and 510C) can be driven by drive/sense circuitry 548 and sense electrodes (e.g., touch electrodes 506A and 506B) can be sensed by drive/sense circuitry 548 (connections not shown). In some examples, self-capacitance of touch electrodes (e.g., touch electrode 510C) can be driven and/or sensed by drive/sense circuitry 548.

Although FIGS. 5A-5B illustrate flexible touch sensor panels 500 and 520 with flexible electrode connectors for row electrodes shown and electrode connectors for column electrodes omitted and FIG. 5C illustrates flexible touch sensor panel 540 with flexible electrode connectors for column electrodes shown and electrode connectors for row electrodes omitted, it is understood that an exemplary flexible touch sensor panel according to examples of the disclosure can be a flexible touch sensor panel incorporating the flexible electrode connector configurations from both FIGS. 5A-5B and FIG. 5C. For example, in some examples, a flexible touch sensor panel can have row touch electrodes connected using the flexible electrode connector configuration described in FIGS. 5A-5B and column touch electrodes connected using the flexible electrode connector configuration described in FIG. 5C. In some examples, a flexible touch sensor panel can have row touch electrodes connected using the flexible electrode connector configuration described in FIG. 5C and column touch electrodes connected using the flexible electrode connector configuration described in FIGS. 5A-5B. In some examples, the row or column touch electrodes are not limited to only a single configuration type (e.g., each row or column of touch electrodes can implement a different flexible routing style).

Figure 6A:
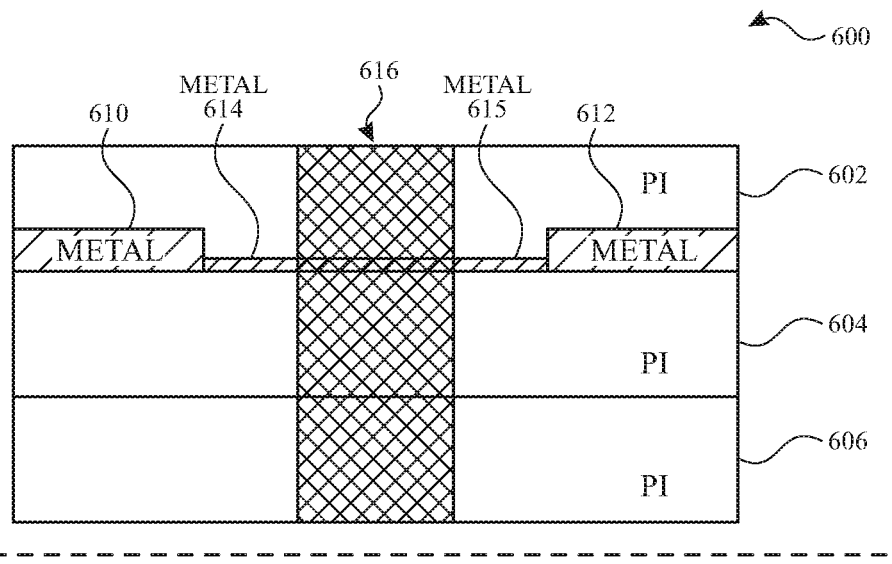
FIGS. 6A-6D illustrate example material of exemplary flexible touch sensor panels according to examples of the disclosure.

FIGS. 6A-6D illustrate example material of exemplary flexible touch sensor panels according to examples of the disclosure. FIG. 6A illustrates a symbolic cross-sectional illustration of the configuration shown in FIG. 5A across line A-B, as shown. In some examples, a flexible touch sensor panel (e.g., flexible touch sensor panels 500, 540, and 700) can be formed of stackup 600, as will be described in further detail. In some examples, stackup 600 can comprise polyimide (PI) layers 602, 604, and 606. In some examples, stackup 600 can comprise more or fewer PI layers and/or can include layers formed of other materials. In some examples, metal (or another conductive material suitable to form a touch electrode) can be deposited or patterned on PI layer 604 (e.g., within PI layer 602) to form touch electrodes 610 and 612 (e.g., corresponding to touch electrodes 506A and 506B). In some examples, a metal (or another conductive material suitable to form an electrode connector) layer can be deposited or patterned on PI layer 604 (e.g., within PI layer 602) between touch electrodes 610 and 612 to form electrode connectors to electrically couple touch electrodes 610 and 612.

In some examples, the metal layer can be deposited or patterned on PI layer 604 (e.g., within PI layer 602) of stackup 600 and etched to form the serpentine patterns described above (e.g., stackup 600 can be etched vertically to remove PI and metal material). For example, stackup 600 can be etched to remove selective portions of material from etch area 616 (e.g., etch all portions other than those portions that make up the serpentine touch electrode connectors), which includes PI material from PI layers 602, 604, and 606 and metal material that has been deposited on PI layer 604. Thus, in such examples, the etching process can preserve certain portions of stackup 600. Such unetched portions of stackup 600 can include metal 614, metal 615 and the PI material above and below metal 614 and metal 615 (e.g., from PI layers 602, 604, and 606). Thus, in some examples, metal 614 and metal 615 (e.g., the portions not removed by etching) can correspond to the segments of flexible electrode connector 502B that couple to touch electrodes 610 and 612 (e.g., the "beginning" and "end" of the serpentine routing pattern). Although FIG. 6A illustrates a cross-section of stackup 600 across lines A-B with etching on etch area 616 leaving unetched only the areas adjacent to touch electrodes 610 and 612, it is understood that the entire area of stackup 600 between touch electrodes 610 and 612 can be etched to form the serpentine routing pattern, as will be shown in more detail in FIG. 6B.

Figure 6B:
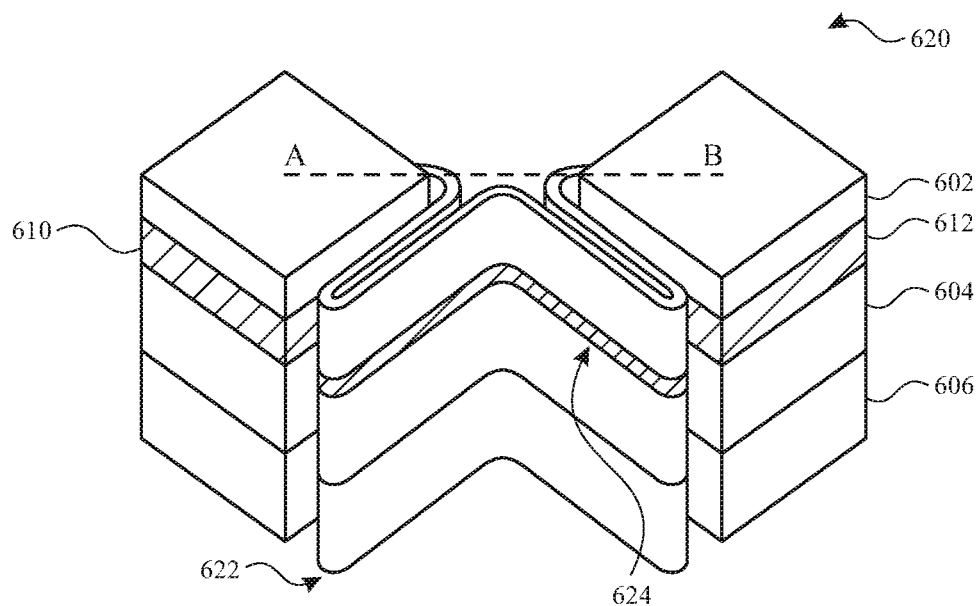

FIG. 6B illustrates a symbolic three-dimensional illustration of the configuration shown in FIG. 5A and FIG. 6A across line A-B, as shown. As shown, stackup 620 includes PI layers 602, 604, and 606. In some examples, a flexible touch sensor panel (e.g., flexible touch sensor panels 500, 540, and 700) can be formed of stackup 620. As described above, metal can be deposited or patterned on PI layer 604 (e.g., within PI layer 602) to form touch electrodes 610 and 612. In some examples, a metal layer can be deposited or patterned on PI layer 604 (e.g., within PI layer 602) of stackup 620 and etched to form the serpentine patterns described above. As illustrated in FIG. 6B, the unetched areas of stackup 620 can form serpentine routing 622. In some examples, the etching can remove some or all of the PI material from PI layers 602, 604, and 606 and some or all of the metal material in the areas between touch electrodes 610 and 612 that do not correspond to the serpentine routing of the electrode connectors (e.g., leaving unetched only the serpentine routing of the electrode connectors and the areas of the touch electrodes 610 and 612). Thus, the etching process creates serpentine routing 622 comprised of a three PI layer stackup (e.g., PI layers 602, 604, and 606) and a metal layer electrically coupling touch electrodes 610 and 612. In some examples, the metal layer in serpentine routing 622 can form flexible electrode connector 624 (e.g., corresponding to flexible electrode connector 502B) that electrically couples touch electrode 610 to touch electrode 612. In some examples, serpentine routing 622 (and flexible electrode connector 624) can have a routing pattern similar to the serpentine routing pattern described above with respect to FIG. 5A. In some examples, serpentine routing 622 can have a serpentine routing pattern similar to any of the routings described above with respect to FIG. 5A-C. As described above in FIG. 6A, metal 614 and metal 615 can correspond to the portions of flexible electrode connector 624 along line A-B that are adjacent to touch electrode 610 and 612 and couple with touch electrode 610 and 612. In some examples, the non-metallic PI layers of serpentine routing 622 (e.g., above and below flexible electrode connector 624) can provide mechanical stability to serpentine routing 622 and flexible electrode connector 624. For example, when touch electrodes 610 and 612 move closer together or farther away due to external mechanical forces, serpentine routing 622 can bend or otherwise change shape to conform to the changed distance between touch electrodes 610 and 612 while protecting and maintaining the mechanical integrity of serpentine routing 622 and flexible electrode connector 624. In some examples, when touch electrodes 610 and 612 are not experiencing bending, flexing, or other mechanical forces, serpentine routing 622 (and/or flexible electrode connector 624) can exert a mechanical force on touch electrodes 610 and/or 612 to return the touch electrodes back to their resting (equilibrium) positions and/or to return to their resting (equilibrium) distances with respect to each other and/or other touch electrodes.

Figure 6C:
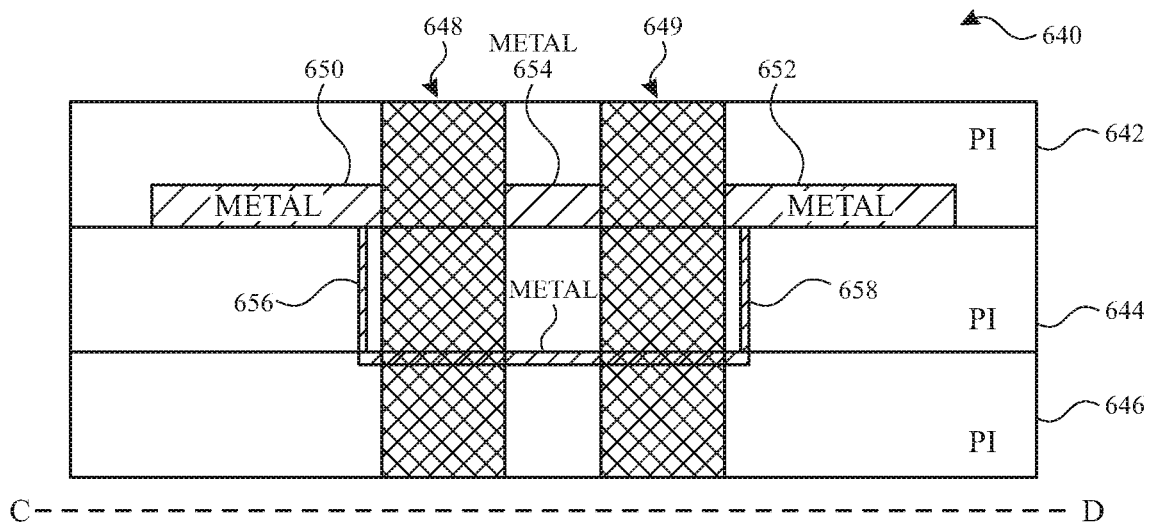

FIG. 6C illustrates a symbolic cross-sectional illustration of the configuration shown in FIG. 5C across line C-D, as shown. In some examples, stackup 640 can comprise PI layers 642, 644, and 646. In some examples, stackup 640 can comprise more or fewer PI layers and/or can include layers formed of other materials. In some examples, metal (or another conductive material suitable to form a touch electrode) can be deposited or patterned on PI layer 644 (e.g., within PI layer 642) to form touch electrodes 650, 652 (e.g., corresponding to touch electrodes 510A and 510B), and 654 (e.g., corresponding to touch electrode 506B). In some examples, a metal (or another conductive material suitable to form a touch electrode) can be deposited or patterned on the bottom side of PI layer 644 (in PI layer 646) between touch electrodes 650 and 652 to form electrode connectors to electrically couple touch electrodes 650 and 652.

In some examples, the metal layer can be deposited or patterned in the areas between the touch electrodes on stackup 640 (e.g., the gaps between the touch electrodes), including at least some overlapping with areas of the touch electrodes (e.g., to allow vias to electrically couple the touch electrodes to the electrode connectors) and etched to form the serpentine patterns described above. For example, as shown in FIG. 6C, stackup 640 can be etched to remove all material from etch areas 648 and 649, except the portions making up the serpentine routing of the electrode connector, which includes PI material from PI layers 642, 644, and 646 and metal material that has been deposited on PI layer 644. Thus, in such examples, the etching process preserves certain portions of stackup 640 (e.g., those portions including touch electrodes 650, 652 and 654, and those portions making up the serpentine routing of the electrode connector). Such unetched portions of stackup 640 can include touch electrodes 650, 652, and 654, and the PI and metal material above and below touch electrodes 650, 652, and 654. In some examples, as shown in FIG. 6C, vias 656 and 658, filled with metal or other conductive material, can be patterned in PI layer 644 to electrically connect touch electrodes 650 and 652 in PI layer 642 to the flexible electrode connector in PI layer 646. In some examples, vias 656 and 658 can be patterned and filled before metal for touch electrodes 650, 652 and the metal on the bottom side of PI layer 644 are deposited on PI layer 644. Although FIG. 6C illustrates a cross-section of stackup 640 across lines C-D with etching on etch areas 648 and 649 leaving unetched only the areas below touch electrodes 650, 652, and 654, it is understood that the entire area of stackup 640 between and around touch electrodes 650, 652, and 654 can be etched to form the serpentine routing pattern, as will be shown in more detail in FIG. 6D.

In some examples, stackup 640 can form a pixelated self-capacitance based touch sensor panel. In such an example, stackup 640 can have similar serpentine routing patterns described above but without vias 656 and 658. In other words, stackup 640 can be fabricated such that vias 656 and 658 are not deposited or patterned on PI layer 644 (while the metal on the bottom side of PI layer 644 remains). Omitting the vias in this manner can allow the flexible electrode connector (e.g., and/or the accompanying PI layers above and below the flexible electrode connector) to physically provide for flexibility but eliminate the electrical coupling between the touch electrodes. In some examples, the flexible electrode connector with omitted vias can be referred to as mechanical electrode connectors and can mechanically couple to the respective touch electrodes. In some examples, electrical coupling for the pixelated touch electrodes can be individually routed using a different flexible electrode connector architecture and/or can be routed on a different layer than those described above.

Figure 6D:
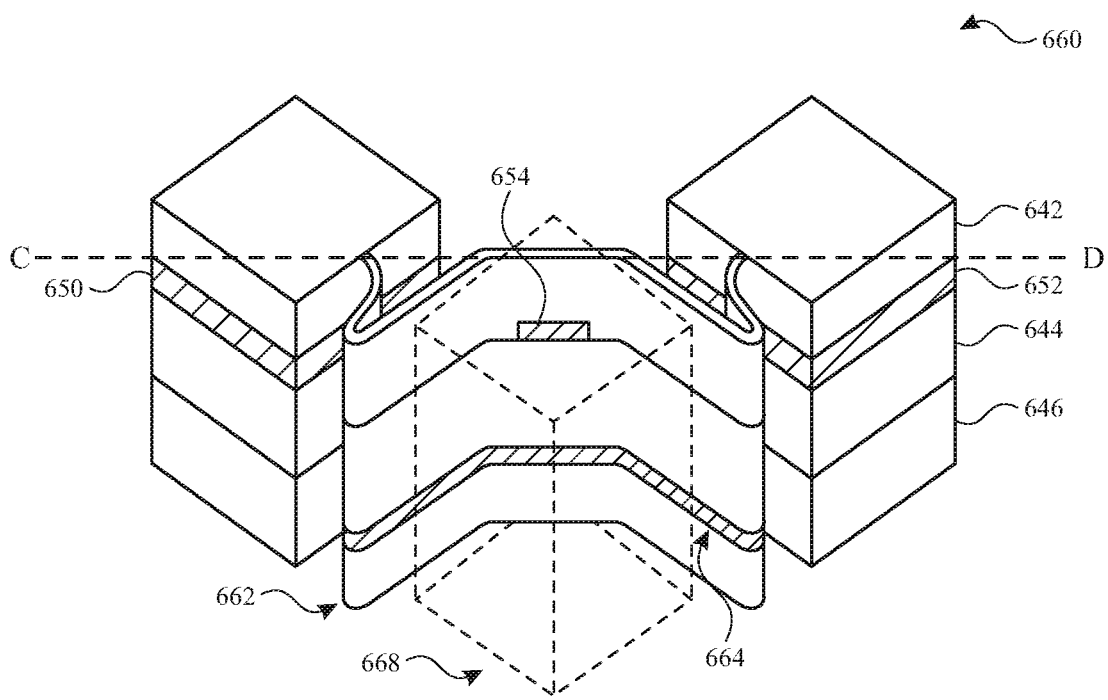

FIG. 6D illustrates a symbolic three-dimensional illustration of the configuration shown in FIG. 5C and FIG. 6C across line C-D, as shown. As shown, stackup 660 includes PI layers 642, 644, and 646. In some examples, a flexible touch sensor panel (e.g., flexible touch sensor panels 500, 540, and 700) can be formed of stackup 660. As described above, metal can be deposited or patterned on PI layer 644 (e.g., within PI layer 642) to form touch electrodes 650, 652, and 654. In some examples, metal can be deposited or patterned on the bottom side of PI layer 644 (in PI layer 646), including at least some overlap with the touch electrodes (e.g., to allow vias to electrically connect the touch electrodes to the electrode connectors) and etched to form the serpentine patterns described above. As illustrated in FIG. 6D, stackup 660 can be etched to form serpentine routing 662 (e.g., corresponding to flexible electrode connector 542A). In some examples, the etching can remove some or all of the PI material from PI layers 642, 644, and 646 and some or all of the metal material in the areas between touch electrodes 650 and 652 that do not correspond to the serpentine routing of the electrode connectors (e.g., leaving unetched only the serpentine routing of the electrode connectors and the areas of the touch electrodes 650, 652, and 654). Thus, the etching process creates serpentine routing 662 comprised of a three PI layer stackup (e.g., PI layers 642, 644, and 646) and a metal layer in PI layer 646. In some examples, the metal layer in serpentine routing 662 can form flexible electrode connector 664 (e.g., corresponding to flexible electrode connector 542A) that electrically couples touch electrode 650 to touch electrode 652 (e.g., by vias, not shown, as described above).

In some examples, serpentine routing 662 (and flexible electrode connector 664) can have a routing pattern similar to the serpentine routing pattern described above with respect to FIG. 5C. As shown, in some examples, serpentine routing 662 can have a straight section where serpentine routing 662 intersects (e.g., to allow flexible electrode connector 664 to route through, on a different layer) with another touch electrode. As discussed above, serpentine routing is not required for sections of the flexible electrode connector 664 that are within the area of a touch electrode (e.g., touch electrode 654) because flexing within that area can be minimal to non-existent. FIG. 6D illustrates column 668 as a three-dimensional illustration of the volume of stackup 660 encompassed by touch electrode 654. For ease of illustration, column 668 is illustrated with dashed lines only for the purpose of not obscuring serpentine routing 662. In some examples, column 668 can have the same three PI layer stackup and include metal patterned on PI layer 644 (e.g., within PI layer 642) to form touch electrode 654. Only the area of touch electrode 654 that intersects with serpentine routing 662 is illustrated, for ease of description. Thus, as shown, serpentine routing 662 can intersect with a section of column 668 (e.g., serpentine routing 662 passes through a corner of column 668) and because flexible electrode connector 664 is routed within the PI layer 646 (e.g., the bottom PI layer), flexible electrode connector 664 can route across touch electrode 654 without unintentionally coupling with touch electrode 654 (e.g., which resides within PI layer 642, the top PI layer).

In some examples, serpentine routing 662 can have a serpentine routing pattern similar to any of the routings described above with respect to FIG. 5A-C. In some examples, the non-metallic PI layers of serpentine routing 662 can provide mechanical stability to serpentine routing 662 and flexible electrode connector 664. For example, when touch electrodes 650 and 652 move closer together or farther away due to external mechanical forces, serpentine routing 662 can bend or otherwise change shape to conform to the changed distance between touch electrodes 650 and 652 while protecting and maintaining the mechanical integrity of serpentine routing 662 and flexible electrode connector 664. In some examples, when touch electrodes 650 and 652 are not experiencing bending, flexing, twisting, or other mechanical forces, serpentine routing 662 (and/or flexible electrode connector 664) can exert a mechanical force on touch electrodes 650 and/or 652 to return the touch electrodes back to their resting (equilibrium) positions and/or to return to their resting (equilibrium) distances with respect to each other and/or other touch electrodes.

Although FIGS. 6C-6D illustrate flexible electrode connector fully routing in a layer different from the layers of touch electrodes 650, 652, and 654 and connecting to touch electrodes 650 and 652 using vias 656 and 658, it is understood that flexible electrode connector 664 can be partially routed on the same layer as touch electrodes 650, 652, and 654 and can be partially routed on a different layer as touch electrodes 650, 652, and 654. For example, flexible electrode connector 664 can route in PI layer 642 (e.g., the same layer as touch electrodes 650, 652, and 654) in areas where flexible electrode connector 664 does not need to route across touch electrode 654 (e.g., where the flexible electrode connector couples to touch electrodes 650 and 652 and in the gaps between the electrodes), in a manner similar to that described in FIG. 6A-6B. In such examples, a via (similar to vias 656 and 658) can be used to route flexible electrode connector 664 to PI layer 646 (e.g., a different layer than touch electrodes 650, 652, and 654) at the portion of flexible electrode connector 664 where flexible electrode connector 664 routes across touch electrode 654, to avoid flexible electrode connector 664 from unintentionally electrically coupling with touch electrode 654.

Figure 7:
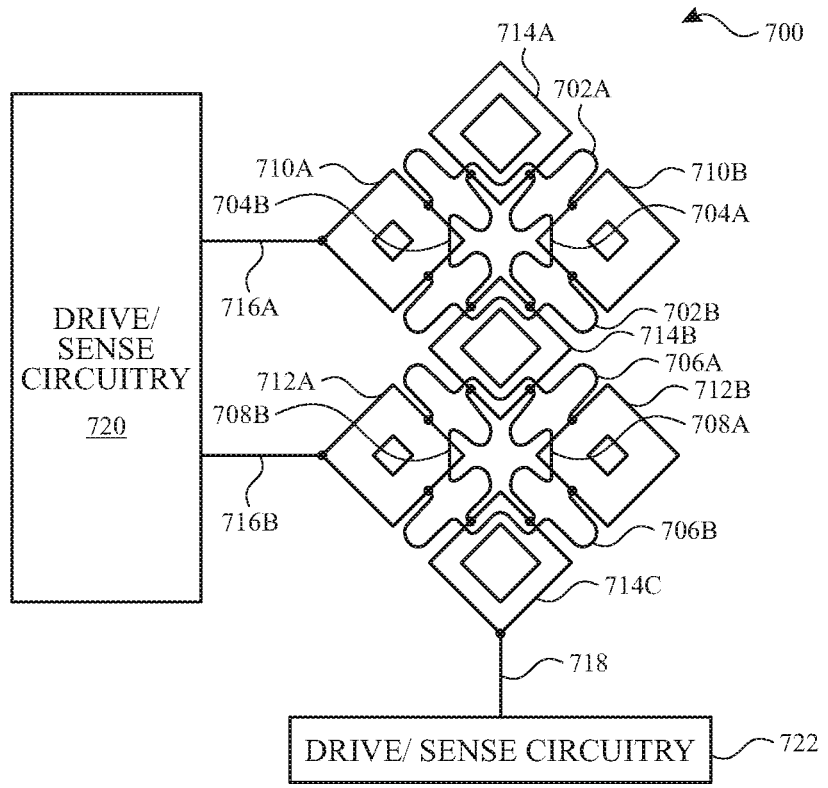
FIG. 7 illustrates an exemplary touch sensor panel including flexible electrode connectors according to examples of the disclosure.

FIG. 7 illustrates an exemplary touch sensor panel 700 including flexible electrode connectors 702A-B, 704A-B, 706A-B, and 708A-B according to examples of the disclosure. Similarly to flexible touch sensor panels 500 and 540, flexible touch sensor panel 700 can include rows and columns of touch electrodes. In some examples, as illustrated in FIG. 7, touch electrodes can include gaps in the center of the touch electrodes. In some examples, the gaps in the touch electrodes can have the same shape as the touch electrodes. In some examples, other shaped gaps can be used. In some examples, gaps in the touch electrode can allow light to pass through (e.g., light from a display disposed below the flexible touch sensor panel). In some examples, the size of the gaps can be different sizes. For example, the gaps in drive electrodes (e.g., touch electrodes 714A, 714B, and 714C) can be larger (e.g., the drive electrode is thinner) than the gaps in sense electrodes (e.g., touch electrodes 710A-B, 712A-B) (e.g., the sense electrode material is thicker). In some examples, the gaps in sense electrodes can be larger than the gaps in drive electrodes. In some example, a smaller gap in sense electrodes can allow sense electrodes to be larger (e.g., comprise more metal material) and increase the sensing sensitivity and accuracy of the sense electrodes. In some examples, the gaps can be formed by selectively etching areas of the touch electrodes. Thus, because the touch electrodes have gaps to allow light to pass through, flexible electrode connectors must avoid intersecting with the gaps in the electrodes and obscuring light from passing through. Thus, FIG. 7 illustrates example serpentine routing patterns which can route across touch electrodes without obscuring the gaps in the touch electrodes. For example, an exemplary serpentine routing pattern can route across a corner of a touch electrode by routing along the edge of the touch electrode and avoiding the gaps, as will be described in further detail below.

In some examples, as shown in FIG. 7, a column of touch electrodes can be electrically coupled by flexible electrode connectors. For example, touch electrode 714A can be electrically coupled to touch electrode 714B via flexible electrode connectors 704A and 704B and touch electrode 714B can be coupled to touch electrode 714C via flexible electrode connectors 708A and 708B. In some examples, flexible electrode connectors 704A and 704B can be routed in parallel to provide two parallel electrical couplings between touch electrodes 714A and 714B. In some examples, a single flexible electrode connector can be used to electrically couple touch electrodes 714A and 714B. As shown in FIG. 7, flexible electrode connector 704A and 704B can couple to an edge of touch electrode 714A and touch electrode 714B. In some examples, the routing of flexible electrode connector 704B can be a reflection of flexible electrode connector 704A across an axis (e.g., the vertical axis).

In some examples, flexible electrode connectors 704A and 704B can have a routing pattern which allows touch electrodes 714A and 714B to move closer together or farther apart while maintaining electrical connectivity (e.g., without breaking the flexible electrode connectors or otherwise disconnecting the electrical connection). In some examples, flexible electrode connector 704A and 704B can have a serpentine routing pattern or a butterfly routing pattern. In some examples, flexible electrode connector 704A and 704B can have other routing patterns, including zigzags, meanders, loops, a series of buckles, or any other suitable routing pattern allows stretching or twisting of the flexible electrode connector while maintaining electrical coupling and connectivity. For example, starting from an edge of touch electrode 714A (e.g., electrically and mechanically coupled to touch electrode 714A at that edge), flexible electrode connector 704A can first route diagonally in a downward-leftward direction (e.g., diagonally towards touch electrode 714B) parallel to touch electrode 714A. When flexible electrode connector 704A reaches the lower corner or approaches the lower-left edge of touch electrode 714A, flexible electrode connector 704A can then loop back and route diagonally in a upward-rightward direction (diagonally away from touch electrode 714B). In some examples, flexible electrode connector 542A can loop back before reaching the lower-left edge of touch electrode 714A. When flexible electrode connector 714B reaches a particular point along the edge of touch electrode 710B (e.g., so as to not interfere with the coupling of flexible electrode connector 702A with touch electrode 710B), flexible electrode connector 704A can route downwards (e.g., towards touch electrode 714B) and across touch electrode 710B. In some examples, flexible electrode connector 704B can route downwards and across touch electrode 710B at any point along the edge of touch electrode 710B. Thus, flexible electrode connector 704A can partially traverse the gap between touch electrodes 714A and 710B (e.g., in the gap and/or along the gap between the two adjacent electrodes).

In some examples, flexible electrode connector 704A can route in a layer above or in a layer below the layer in which touch electrode 710B is located. In some examples, routing in a different layer can prevent flexible electrode connector 704A from coupling with touch electrode 710B, as described above. In some examples, similarly to flexible electrode connector 542A, flexible electrode connector 704A can be entirely routed on a different layer than touch electrodes 714A, 714B and 710B and can be coupled to touch electrodes 714A and 714B using vias. For example, as illustrated in FIG. 7, touch electrodes 714A, 714B, and 710B can be located in a top layer of flexible touch sensor panel 700 (e.g., in a 3 layer stackup) and flexible electrode connector 704A can be located in the bottom layer of flexible touch sensor panel 700 (e.g., in a 3 layer stackup). In such example, a first via can be located within the area of touch electrode 714A, at or near the edge of touch electrode 714A and can provide electrical connectivity from touch electrode 714A in the top layer through the one or more middle layers of flexible touch sensor panel 700 to flexible electrode connector 704A in the bottom layer. In some examples, a second via can be located within the area of touch electrode 714B, at or near the edge of touch electrode 714B and can provide electrical connectivity from touch electrode 714B in the top layer through the one or more middle layers of flexible touch sensor panel 700 to flexible electrode connector 704A in the bottom layer. In some examples, a portion of flexible electrode connector 704A can be in the same layer as touch electrode 714A and 714B (e.g., the areas which do not risk unintentional coupling with other electrodes) and a portion of flexible electrode connector 704A can be routed in a different layer (e.g., the areas which risk unintentional coupling with other electrodes, such as when flexible electrode connector 704A routes across touch electrode 710B). In some examples, vias can be used to route flexible electrode connector 704A to different layers at any point along the serpentine pattern.

Referring back to FIG. 7, flexible electrode connector 704A can be routed down (e.g., towards touch electrode 714B) and across touch electrode 710B (e.g., on a layer different from touch electrode 710B). In some examples, this downward route can be a straight line and need not be routed in a serpentine routing pattern. In such examples, because touch electrode 710B is a more rigid material, serpentine routing may not be necessary when flexible electrode connector 704A is within the area of touch electrode 710B, because flexing within that area can be minimal to non-existent. In some examples, when flexible electrode connector 704A reaches the gap between touch electrode 710B and 714B, flexible electrode connector 704A can resume its serpentine routing pattern and route diagonally in a upward-leftward direction (e.g., parallel to touch electrode 714B). When flexible electrode connector 704A reaches the left corner or approaches the top-left edge of touch electrode 710B, flexible electrode connector 704A can then loop back and route diagonally in a downward-rightward direction (e.g., parallel to touch electrode 714B, but in the opposite direction as previously). In some examples, flexible electrode connector 704A can then couple to an edge of touch electrode 714B (e.g., electrically and mechanically coupled to touch electrode 714A at that edge). Thus, flexible electrode connector 704A can partially traverse the gap between touch electrodes 710B and 714B (e.g., in the gap and/or along the gap between the two adjacent electrodes). Although FIG. 7 illustrates flexible electrode connector 704A coupling to the edges of touch electrode 714A and 714B, it is understood that the flexible electrode connectors can be connected to the corners of the respective touch electrodes, similar to that described above with respect to FIG. 5A.

The serpentine routing pattern of flexible electrode connector 702A will now be described. In some examples, as shown in FIG. 7, a row of touch electrodes can be electrically coupled by flexible electrode connectors. For example, touch electrode 710A can be electrically coupled to touch electrode 710B via flexible electrode connectors 702A and 702B. In some examples, flexible electrode connectors 702A and 702B can be a flexible metal trace. In some examples, the touch electrodes can be a rigid material, a semi-rigid material, or otherwise more rigid than the flexible electrode connectors. In some examples, flexible electrode connectors 702A and 702B can be routed in parallel to provide two parallel electrical connections between touch electrodes 710A and 710B. In some examples, having two parallel connectors can provide mechanical stability while flexible touch sensor panel 700 is flexing or otherwise experiencing mechanical pressure. In some examples, a single flexible electrode connector can be used to electrically couple touch electrodes 710A and 710B. As shown in FIG. 7, flexible electrode connector 702A and 702B can couple to an edge of touch electrode 710A and touch electrode 710B. In some examples, the routing of flexible electrode connector 702B can be a reflection of flexible electrode connector 702A across an axis (e.g., the horizontal axis).

In some examples, flexible electrode connectors 702A and 702B can have a routing pattern which allows touch electrodes 710A and 710B to move closer together or farther away from each other while maintaining electrical connectivity (e.g., without breaking the flexible electrode connectors or otherwise disconnecting the electrical connection). In some examples, flexible electrode connector 702A and 702B can have a serpentine routing pattern or a butterfly routing pattern. In some examples, flexible electrode connector 702A and 702B can have other routing patterns, including zigzags, meanders, loops, a series of buckles, or any other suitable routing pattern allows stretching or twisting of the flexible electrode connector while maintaining electrical coupling and connectivity. For example, starting from the upper-right edge of touch electrode 710A (e.g., electrically and mechanically coupled to touch electrode 710A at that edge), flexible electrode connector 702A can first route diagonally in an upward-leftward direction (e.g., diagonally away from touch electrode 710B), parallel to the upper-right edge of touch electrode 710A. When flexible electrode connector 702A reaches the top corner or approaches the upper-left edge of touch electrode 710A, flexible electrode connector 702A can then loop back and route diagonally in a downward-rightward direction (diagonally towards touch electrode 710B). In some examples, flexible electrode connector 702A can loop back before reaching the upper-left edge of touch electrode 710A. Before flexible electrode connector 702A reaches the point where flexible electrode connector 704B couples to touch electrode 714A, flexible electrode connector 702A can route into the area of touch electrode 714A. Thus, flexible electrode connector 702A can partially traverse the gap between touch electrodes 710A and 714A (e.g., in the gap and/or along the gap between the two adjacent electrodes). In some examples, flexible electrode connector 702A can route in an upper-rightward direction into the area of touch electrode 714A (e.g., at a layer different from touch electrode 714A to avoid electrically coupling with touch electrode 714A). In some examples, after flexible electrode connector 702A routes into the area of touch electrode 714A, flexible electrode connector 702A can follow the shape of touch electrode 714A (e.g., following the shape of the bottom corner of electrode 714A to route around the bottom corner to the lower-right edge of touch electrode 714A). For example, after routing into the area of touch electrode 714A, flexible electrode connector can route around the coupling point between flexible electrode connector 704B and touch electrode 714A. After routing around the coupling point, flexible electrode connector 702A can continue along the area of touch electrode 714A (e.g., the lower-left edge of touch electrode 714A) in a downward-rightward direction (e.g., without breaching into the gap of touch electrode 714A). In some examples, when flexible electrode connector 702A reaches or approaches the bottom corner of touch electrode 714A, flexible electrode connector 702A can turn in an upward-rightward direction and continue following the area of touch electrode 714A (e.g., the lower-right edge of touch electrode 714A). In some examples, flexible electrode connector 702A can route around the coupling point between flexible electrode connector 704A and touch electrode 714A. After routing around the coupling point, flexible electrode connector 702A can exit the area of touch electrode 714A in a downward-rightward direction. In some examples, the route of flexible electrode connector 702A while in the area of touch electrode 714A can be in straight line paths and need not be routed in a serpentine routing pattern. In such examples, because touch electrode 714A is a more rigid material, serpentine routing may not be necessary when flexible electrode connector 702A is within the area of touch electrode 714A, because flexing within that area can be minimal to non-existent. In some examples, when flexible electrode connector 702A reaches the gap between touch electrodes 714A and 710B, flexible electrode connector 702A can route in an upward-rightward direction (e.g., parallel to the lower-right edge of touch electrode 714A). In some examples, when flexible electrode connector 702A reaches the right corner or approaches the upper-right edge of touch electrode 714B, flexible electrode connector 702A can then loop back and route diagonally in a downward-leftward direction (e.g., parallel to touch electrode 710B, but in the opposite direction as previously). In some examples, flexible electrode connector 702A can loop back before reaching the top-left edge of touch electrode 710B. In some examples, flexible electrode connector 702A can then couple to the edge of touch electrode 710B (e.g., electrically and mechanically coupled to touch electrode 710B at that edge). Thus, flexible electrode connector 702A can partially traverse the gap between touch electrodes 714A and 710B (e.g., in the gap and/or along the gap between the two adjacent electrodes).

In some examples, flexible electrode connector 702A can be routed in a different layer as touch electrodes 710A, 710B, and 714B. In some examples, a portion of flexible electrode connector 702A can be routed on the same layer as touch electrodes 710A, 710B, and 714B (e.g., the areas which do not risk unintentional coupling with other electrodes) and a portion of flexible electrode connector 702A can be routed on a different layer as touch electrodes 710A, 710B, and 714B (e.g., the areas which risk unintentional coupling with other electrodes, such as when flexible electrode connector 702A routes into the area of touch electrode 714A and follows the edge of touch electrode 714A). Although FIG. 7 illustrates flexible electrode connector 702A coupling to edges of touch electrode 710A and 710B, it is understood that the flexible electrode connectors can be connected at the corners of the respective touch electrodes, similar to that described above with respect to FIG. 5A.

In some examples, the serpentine routing pattern described above can allow flexible electrode connectors 704A and 702A to flex, bend, twist, or otherwise change its shape in response to the respective touch electrodes moving closer together or farther away from each other. In some examples, when flexible touch sensor panel 700 is not experiencing bending, flexing, twisting, or other mechanical forces, the shape of flexible electrode connectors 704A and 702A can return to the above-described routing pattern (e.g., resting or equilibrium shape). For example, the serpentine routing pattern (or the material of flexible electrode connector 702A in combination with the serpentine routing pattern) can allow flexible electrode connector 702A to return to its resting (equilibrium) position and/or can exert a mechanical force on touch electrodes 710A and/or 710B to return the touch electrodes back to their resting (equilibrium) positions and/or to return to their resting (equilibrium) distances with respect to each other and/or other touch electrodes. In some examples, other flexible routing patterns can be used. In some examples, flexible electrode connectors 706A, 706B, 708A and 708B can have similar routing patterns as flexible electrode connectors 702A, 702B, 704A, and 708B, respectively (e.g., to electrically couple touch electrodes 714B and 714C, and touch electrodes 712A and 712B, respectively). In some examples, the flexible electrode connectors can comprise one or more layers, including a metallic layer that provides electrical connectivity. In some examples, the one or more layers can comprise a polyimide (PI) layer, which can provide mechanical stability to the flexible electrical connectors when flexing, as described above. For example, flexible electrode connectors 704A can have a stackup similar to stackup 600 and 620 described with reference to FIGS. 6A-6B and flexible electrode connectors 702A can have a stackup similar to stackup 640 and 660 described with reference to FIGS. 6C-6D.

In some examples, flexible touch sensor panel 700 can include drive/sense circuitry 720 and 722. In some examples, electrode connectors 716A, 716B, and 718 can be flexible electrode connectors similar to flexible electrode connectors described above and can have a similar serpentine routing pattern. In some examples, a portion of electrode connectors 716A, 716B, and 718 can have a serpentine routing pattern and a portion of electrode connectors 716A, 716B, and 718 can have a more conventional routing pattern. In some examples, drive/sense circuitry 720 and 722 can drive and/or sense the mutual capacitance of the electrodes. In such examples, drive/sense circuitry 720 can drive the row electrodes while drive/sense circuitry 722 can sense the column electrodes. In some examples, drive/sense circuitry 722 can drive the column electrodes while drive/sense circuitry 720 can sense the row electrodes. In some examples, drive/sense circuitry 720 and 722 can be configured to drive and/or sense self-capacitance of the electrodes. In some examples, drive/sense circuitry 720 and 722 can include drive/sense interface 225 and can include exemplary touch sensor circuits described with respect to FIGS. 3A-3B. In some examples, drive/sense circuitry 720 and 722 can be the same as or similar to drive/sense circuitry 514 described above. For example, touch electrode 710A (and/or touch electrode 710B) can correspond to sense electrode 326 and can alter mutual capacitance 324 when a finger (e.g., finger 305) and/or object approaches or contacts the intersection of touch electrode 710A and a drive electrode. Similarly, touch electrode 714C (and/or touch electrodes 714A and 714B) can correspond to drive electrode 322 and can alter mutual capacitance 324 when a finger (e.g., finger 305) and/or object approaches or contacts the intersection of touch electrode 714C and a sense electrode. In some examples, drive/sense circuitry 720 and 722 can be integrated into a single drive/sense circuitry.

Although FIG. 7 illustrates an exemplary serpentine routing pattern for column electrodes and an exemplary serpentine routing pattern for row electrodes, it is understood that any of the flexible electrode connectors can have a different flexible routing pattern, such as those described above with respect to FIGS. 5A-5C.

Figure 8:
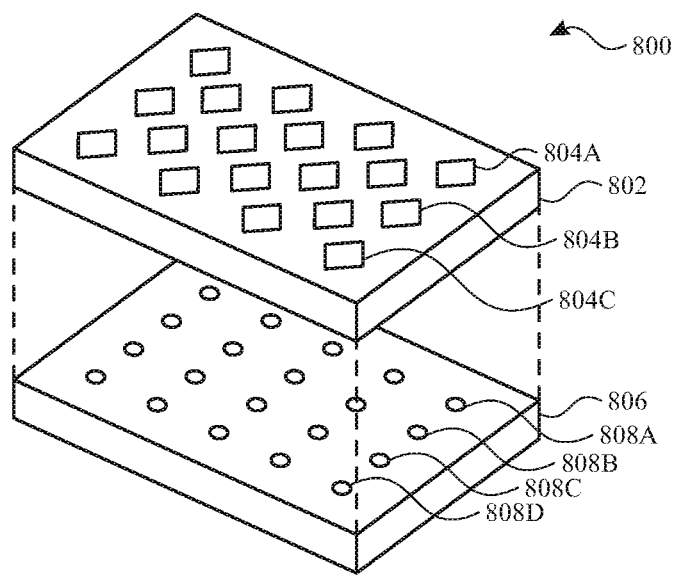
FIG. 8 illustrates an exemplary device including a flexible touch sensor panel and an LED panel according to examples of the disclosure.

FIG. 8 illustrates an exemplary device 800 including a flexible touch sensor panel 802 and an LED panel 806 according to examples of the disclosure. In some examples, flexible touch sensor panel 802 can be similar to the flexible touch sensor panels described above, such as flexible touch sensor panel 500, 540, and 700. In some examples, flexible touch sensor panel 802 can include rows and columns of touch electrodes, including touch electrodes 804A-C, to name a few. In some examples, LED panel 806 can include an array of LEDs (or other light emitting source, such as an LCD display panel), such as LEDs 808A-D, to name a few. In some example, LEDs 808A-D can be individual LEDs. In some examples, the individual LEDs can all be a single color or can comprise different colors. In some example, LEDs 808A-D can each be a cluster of LEDs. In some examples, LEDs 808A-D can be a RGB cluster of LEDs (e.g., contain three LEDs that emit red, green, and blue, respectively).

In some examples, LED panel 806 can be layered below flexible touch sensor panel 802. In some examples, the flexible touch sensor panel can include touch electrodes with gaps, similar to those described above in FIG. 7. In some examples, the gaps in the touch electrode material can allow light from LEDs on LED panel 806 to pass through the gaps. In some examples, each LED cluster (or individual LEDs) can align with a respective touch electrode/touch electrode gap. In some examples, the LED clusters (or individual LEDs) are not aligned with corresponding touch electrodes/touch electrode gaps on flexible touch sensor panel 802. In some examples, LED panel 806 can provide a backlight to flexible touch sensor panel 802. In some examples, LED panel 806 can dynamically change colors and appear to the user as images on flexible touch sensor panel 802. In some examples, the LEDs on LED panel 806 can create patterns on device 800 which, when touched by a user and sensed by flexible touch sensor panel 802, can activate a function on the wearable device. For example, the LEDs on the LED panel 806 can be arranged and/or lit in a pattern to form "play" and "pause" virtual buttons and flexible touch sensor panel 802 can detect touch at the respective locations of the "play" and "pause" virtual buttons and can activate the respective play or pause function on the wearable device. Although FIG. 8 illustrates the LED panel as below the flexible touch sensor panel, it is understood that the LED panel can be formed above the flexible touch sensor panel. In some examples, the LED panel can be formed on touch sensor panel 902 itself (e.g., fabricated onto touch sensor panel 902 as a part of fabricating touch sensor panel 902). In some examples, the LED panel can be separately fabricated and be layered onto flexible touch sensor panel 902 (e.g., by adhesive and/or other bonding method).

Figure 9:
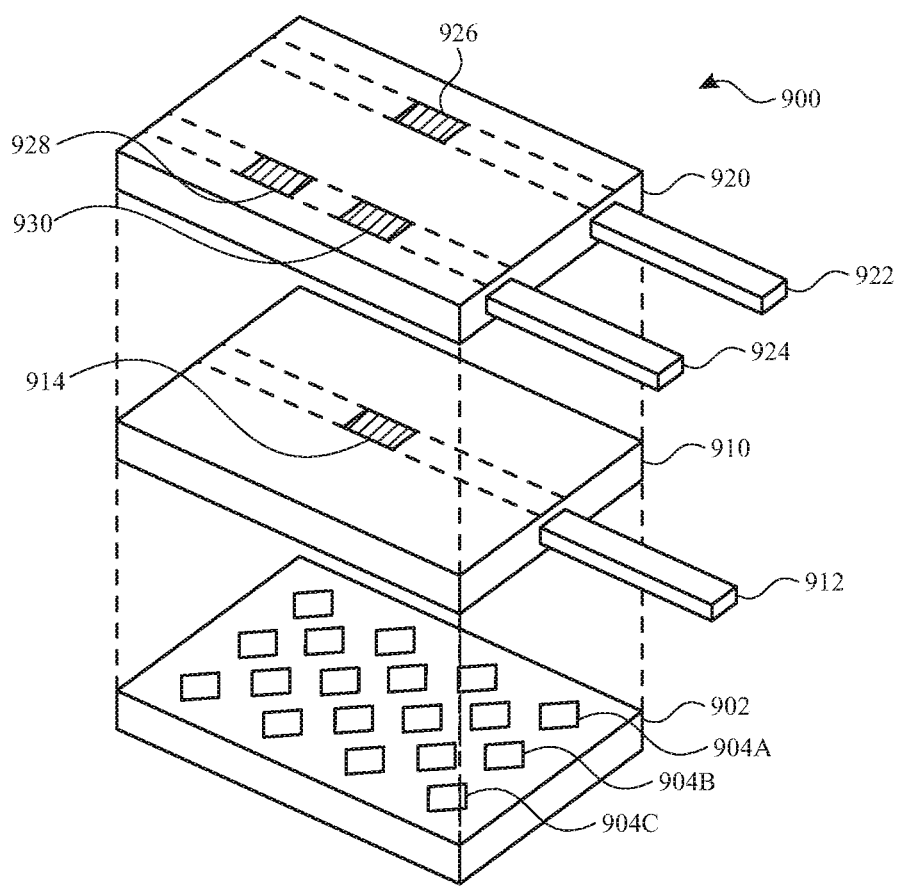
FIG. 9 illustrates an exemplary device including a flexible touch sensor panel and waveguide layers according to examples of the disclosure.

FIG. 9 illustrates an exemplary device 900 including flexible touch sensor panel 902 and waveguide layers 910 and 920 according to examples of the disclosure. In some examples, flexible touch sensor panel 902 can be similar to the flexible touch sensor panels described above, such as flexible touch sensor panel 500, 540, and 700. In some examples, flexible touch sensor panel 902 can include rows and columns of touch electrodes, including touch electrodes 904A-C, to name a few. In some examples, device 900 can include one or more waveguide layers and each waveguide layer can include one or more waveguides. For example, waveguide layer 910 can include waveguide 912 and waveguide layer 920 can include waveguide 922 and waveguide 924. In some examples, a waveguide can provide a single color (e.g., be coupled to a static light source/LED) or can be provided dynamically changing colors (e.g., be coupled to a dynamic light source/LED). In some examples, the waveguide layer can be etched to refract light travelling through the waveguide towards the surface of device 900. In some examples, a waveguide can include one or more etchings along the waveguide. For example, waveguide 912 can include waveguide etching 914 to refract light from waveguide 912 towards the surface. In some examples, waveguide 922 can include waveguide etching 926 and waveguide 924 can include waveguide etching 928 and 930. In some examples, the etchings can be formed in particular patterns such that when light is provided into the waveguide, the refracted light form patterns that appear to the user as images or virtual buttons on device 900. In some examples, when flexible touch sensor panel 902 senses a touch of a user on the virtual buttons created by the waveguides, a corresponding function can be activated on the wearable device. For example, the etchings on the waveguides can be arranged and/or lit in a pattern to form "play" and "pause" virtual buttons and flexible touch sensor panel 902 can detect touch at the respective locations of the "play" and "pause" virtual buttons and activate the respective play or pause function on the wearable device. In some examples, the waveguides can be arranged along the length of the strap of a wearable device (e.g., strap 154). In some examples, the waveguides can be arranged to form a rainbow pattern (e.g., one red waveguide followed by one green waveguide, followed by one blue waveguide, etc.). In some examples, the waveguides can be arranged to form an edge highlight pattern (e.g., the center of the strap includes one color while the edges of the band include a second, different color). In some examples, the waveguides can be arranged to form play, pause, forward, reverse buttons (e.g., for media control) and/or pick-up and hang-up buttons (e.g., for telephone control).

Although FIG. 9 illustrates the waveguide layers as above the flexible touch sensor panel, it is understood that the waveguide layers can be formed below the flexible touch sensor panel (e.g., with light refracted by the waveguide etchings traveling through the gaps in the touch electrodes). For example, waveguide layers 910 and 920 can be formed above flexible touch sensor panel 902, below flexible touch sensor panel 902 or can be formed both above and below flexible touch sensor panel 902. In some examples, the waveguide layers can be formed on touch sensor panel 902 itself (e.g., fabricated onto touch sensor panel 902 as a part of fabricating touch sensor panel 902). In some examples, waveguide layers can be separately fabricated and be layered onto flexible touch sensor panel 902 (e.g., by adhesive and/or other bonding method).

Therefore, according to the above, some examples of the disclosure are directed to a touch sensor panel. The touch sensor panel can comprise a plurality of touch electrodes, including a first touch electrode and a second touch electrode; and a first electrode connector electrically coupling the first touch electrode and the second touch electrode, wherein a shape of the first electrode connector is configured to allow the first touch electrode and the second touch electrode to move closer together and farther away from each other while maintaining the electrical coupling between the first touch electrode and the second touch electrode.

Additionally or alternatively, in some examples, the touch sensor panel can be flexible. Additionally or alternatively, in some examples, the plurality of touch electrodes can include a first set of touch electrodes arranged in a row and a second set of touch electrodes arranged in a column. Additionally or alternatively, in some examples, each touch electrode of the first set of touch electrodes arranged in a row can be electrically coupled to an adjacent touch electrode of the first set of touch electrodes via one or more respective electrode connectors, wherein the shape of the one or more respective electrode connectors can be configured to allow a respective touch electrode and the adjacent touch electrode to move closer together and farther away from each other while maintaining the electrical coupling between the respective touch electrode and the adjacent touch electrode; and each touch electrode of the second set of touch electrodes arranged in a column can be electrically coupled to an adjacent touch electrode of the second set of touch electrodes via one or more given electrode connectors, wherein the shape of the one or more given electrode connectors can be configured to allow a given touch electrode and the adjacent touch electrode to move closer together and farther away from each other while maintaining the electrical coupling between the given touch electrode and the adjacent touch electrode.

Additionally or alternatively, in some examples, the plurality of touch electrodes can be configured to measure a capacitance between adjacent touch electrodes. Additionally or alternatively, in some examples, the shape of the first electrode connector can include a first section of the first electrode connector that routes diagonally away from the first touch electrode coupled to a second section of the first electrode connector that routes diagonally towards the first touch electrode. Additionally or alternatively, in some examples, the shape of the first electrode connector can include a first section of the first electrode connector that routes diagonally away from the second touch electrode coupled to a second section of the first electrode connector that routes diagonally towards the second touch electrode.

Additionally or alternatively, in some examples, the shape of the first electrode connector can include a first section, coupled to the first touch electrode, that routes parallel to an edge of the first touch electrode. Additionally or alternatively, in some examples, the shape of the first electrode connector can include a first section, coupled to the second touch electrode, that routes parallel to an edge of the second touch electrode. Additionally or alternatively, the shape of the first electrode connector can include a first section that routes across a third touch electrode without electrically coupling with the third touch electrode. Additionally or alternatively, the first section of the first electrode connector that routes across the third touch electrode can be routed in a layer of the touch sensor panel different from a layer in which the third touch electrode is formed. Additionally or alternatively, the touch sensor panel can further comprise a second electrode connector electrically coupling the first touch electrode and the second touch electrode in parallel with the first electrode connector, wherein a shape of the second electrode connector can be configured to allow the first touch electrode and the second touch electrode to move closer together and farther away from each other while maintaining the electrical coupling between the first touch electrode and the second touch electrode.

Additionally or alternatively, in some examples, the touch sensor panel can comprise a plurality of layers; the plurality of touch electrodes can be patterned on a first layer of the plurality of layers; and at least a portion of the first electrode connector can be patterned on a second layer, different from the first layer, of the plurality of layers. Additionally or alternatively, in some examples, the touch sensor panel can comprise a plurality of layers; the plurality of touch electrodes can be patterned on a first layer of the plurality of layers; and at least a portion of the first electrode connector can be patterned on the first layer of the plurality of layers. Additionally or alternatively, in some examples, an LED panel, including a plurality of LEDs, can be formed below the touch sensor panel. Additionally or alternatively, in some examples, one or more touch electrodes of the plurality of touch electrodes can include a gap configured to allow light to pass through the gap.

Additionally or alternatively, in some examples, the shape of the first electrode connector can be further configured to route across one of the one of more touch electrodes within an area of the one of the one or more touch electrodes without blocking the gap in the one of the one or more touch electrodes. Additionally or alternatively, one or more waveguide layers can be formed above the touch sensor panel, wherein the waveguide layers include one or more etches configured to refract light. Additionally or alternatively, the plurality of touch electrodes can include a first set of touch electrodes arranged in a row and a second set of touch electrodes arranged in a column; and wherein: a first set of electrode connectors can electrically couple the first set of touch electrodes and can comprise a first serpentine routing pattern including traversing the gaps between the plurality of electrodes; and a second set of electrodes connectors can electrically couple the second set of touch electrodes and can comprise a second serpentine routing pattern, different from the first serpentine routing pattern, including at least partially traversing the gaps between the plurality of electrodes and routing across at least one touch electrode of the first set of touch electrodes. Additionally or alternatively, in some examples, the touch sensor panel can be formed within a flexible material. Additionally or alternatively, in some examples, the flexible material can form at least part of a strap of a wearable device.

Some examples of the disclosure are directed to a touch sensor panel. In some examples, the touch sensor panel can comprise a plurality of individually-addressable touch electrodes, including a first touch electrode electrically coupled to a first electrical connector configured to be coupled to sense circuitry, and a second touch electrode electrically coupled to a second electrical connector configured to be coupled to sense circuitry; and a first mechanical electrode connector mechanically coupling the first touch electrode and the second touch electrode, wherein a shape of the first mechanical electrode connector is configured to allow the first touch electrode and the second touch electrode to move towards and farther away from each other while maintaining the mechanical coupling between the first touch electrode and the second touch electrode.

Additionally or alternatively, in some examples, the shape of the first mechanical electrode connector can include: a first section, mechanically coupled to the first touch electrode, that routes parallel to an edge of the first touch electrode and diagonally away from the second touch electrode; a second section, mechanically coupled to the first section, that routes parallel to the edge of the first touch electrode and diagonally towards the second touch electrode; a third section, mechanically coupled to the second section, that routes parallel to an edge of the second electrode and diagonally away from the first touch electrode; and a fourth section, mechanically coupled to the third section and the second touch electrode, that routes parallel to the edge of the second electrode and diagonally towards the first touch electrode. Additionally or alternatively, in some examples, the plurality of individually-addressable touch electrodes can include a first set of touch electrodes arranged in a row and a second set of touch electrodes arranged in a column; wherein: a first set of electrode connectors can mechanically couple the first set of touch electrodes and can comprise a first serpentine routing pattern including traversing the gaps between the plurality of electrodes; and a second set of electrodes connectors can mechanically couple the second set of touch electrodes and can comprise a second serpentine routing pattern, different from the first serpentine routing pattern, including at least partially traversing the gaps between the plurality of electrodes and routing across at least one touch electrode of the first set of touch electrodes.

Some examples of the disclosure are directed to a method of fabricating a touch sensor panel. In some examples, the method can comprise forming a plurality of touch electrodes, including a first touch electrode and a second touch electrode; and forming a first electrode connector electrically coupling the first touch electrode and the second touch electrode, wherein a shape of the first electrode connector is configured to allow the first touch electrode and the second touch electrode to move closer together and farther away from each other while maintaining the electrical coupling between the first touch electrode and the second touch electrode.

Additionally or alternatively, in some examples, the touch sensor panel can be flexible. Additionally or alternatively, in some examples, the plurality of touch electrodes can include a first set of touch electrodes arranged in a row and a second set of touch electrodes arranged in a column. Additionally or alternatively, in some examples, each touch electrode of the first set of touch electrodes arranged in a row can be electrically coupled to an adjacent touch electrode of the first set of touch electrodes via one or more respective electrode connectors, wherein the shape of the one or more respective electrode connectors can be configured to allow a respective touch electrode and the adjacent touch electrode to move closer together and farther away from each other while maintaining the electrical coupling between the respective touch electrode and the adjacent touch electrode; and each touch electrode of the second set of touch electrodes arranged in a column can be electrically coupled to an adjacent touch electrode of the second set of touch electrodes via one or more given electrode connectors, wherein the shape of the one or more given electrode connectors is configured to allow a given touch electrode and the adjacent touch electrode to move closer together and farther away from each other while maintaining the electrical coupling between the given touch electrode and the adjacent touch electrode.

Additionally or alternatively, in some examples, the shape of the first electrode connector can include a first section of the first electrode connector that routes diagonally away from the first touch electrode coupled to a second section of the first electrode connector that routes diagonally towards the first touch electrode. Additionally or alternatively, in some examples, the shape of the first electrode connector can include a first section of the first electrode connector that routes diagonally away from the second touch electrode coupled to a second section of the first electrode connector that routes diagonally towards the second touch electrode. Additionally or alternatively, in some examples, the shape of the first electrode connector can include a first section, coupled to the first touch electrode, that routes parallel to an edge of the first touch electrode. Additionally or alternatively, in some examples, the shape of the first electrode connector can include a first section, coupled to the second touch electrode, that routes parallel to an edge of the second touch electrode. Additionally or alternatively, in some examples, the shape of the first electrode connector can include a first section that routes across a third touch electrode without electrically coupling with the third touch electrode.

Additionally or alternatively, in some examples, the first section of the first electrode connector that routes across the third touch electrode can be patterned in a layer of the touch sensor panel different from a layer in which the third touch electrode is patterned. Additionally or alternatively, in some examples, the method can further comprise forming a second electrode connector electrically coupling the first touch electrode and the second touch electrode in parallel with the first electrode connector, wherein a shape of the second electrode connector can be configured to allow the first touch electrode and the second touch electrode to move closer together and farther away from each other while maintaining the electrical coupling between the first touch electrode and the second touch electrode.

Additionally or alternatively, in some examples, the touch sensor panel can comprise a plurality of layers; the plurality of touch electrodes can be patterned on a first layer of the plurality of layers; and at least a portion of the first electrode connector can be patterned on a second layer, different from the first layer, of the plurality of layers. Additionally or alternatively, in some examples, the touch sensor panel can comprise a plurality of layers; the plurality of touch electrodes can be patterned on a first layer of the plurality of layers; and at least a portion of the first electrode connector can be patterned on the first layer of the plurality of layers. Additionally or alternatively, in some examples, an LED panel, including a plurality of LEDs, can be formed below the touch sensor panel. Additionally or alternatively, in some examples, one or more touch electrodes of the plurality of touch electrodes can include a gap configured to allow light to pass through the gap. Additionally or alternatively, in some examples, the shape of the first electrode connector can be further configured to route across one of the one of more touch electrodes within an area of the one of the one or more touch electrodes without blocking the gap in the one of the one or more touch electrodes.

Additionally or alternatively, in some examples, one or more waveguide layers can be formed above the touch sensor panel, wherein the waveguide layers can include one or more etches configured to refract light. Additionally or alternatively, in some examples, the plurality of touch electrodes can include a first set of touch electrodes arranged in a row and a second set of touch electrodes arranged in a column; wherein: a first set of electrode connectors can electrically couple the first set of touch electrodes and can comprise a first serpentine routing pattern including traversing the gaps between the plurality of electrodes; and a second set of electrodes connectors electrically can couple the second set of touch electrodes and can comprise a second serpentine routing pattern, different from the first serpentine routing pattern, including at least partially traversing the gaps between the plurality of electrodes and routing across at least one touch electrode of the first set of touch electrodes. Additionally or alternatively, in some examples, the touch sensor panel can be formed within a flexible material. Additionally or alternatively, in some examples, the flexible material can form at least part of a strap of a wearable device.

Some examples of the disclosure are directed to a method of fabricating a touch sensor panel. In some examples, the method can comprise forming a plurality of individually-addressable touch electrodes, including a first touch electrode electrically coupled to a first electrical connector configured to be coupled to sense circuitry, and a second touch electrode electrically coupled to a second electrical connector configured to be coupled to sense circuitry; and forming a first mechanical electrode connector mechanically coupling the first touch electrode and the second touch electrode, wherein a shape of the first mechanical electrode connector is configured to allow the first touch electrode and the second touch electrode to move towards and farther away from each other while maintaining the mechanical coupling between the first touch electrode and the second touch electrode.

Additionally or alternatively, in some examples, the shape of the first mechanical electrode connector can include: a first section, mechanically coupled to the first touch electrode, that can route parallel to an edge of the first touch electrode and diagonally away from the second touch electrode; a second section, mechanically coupled to the first section, that can route parallel to the edge of the first touch electrode and diagonally towards the second touch electrode; a third section, mechanically coupled to the second section, that can route parallel to an edge of the second electrode and diagonally away from the first touch electrode; and a fourth section, mechanically coupled to the third section and the second touch electrode, that can route parallel to the edge of the second electrode and diagonally towards the first touch electrode. Additionally or alternatively, in some examples, the plurality of individually-addressable touch electrodes can include a first set of touch electrodes arranged in a row and a second set of touch electrodes arranged in a column; wherein: a first set of electrode connectors can mechanically couple the first set of touch electrodes and can comprise a first serpentine routing pattern including traversing the gaps between the plurality of electrodes; and a second set of electrodes connectors can mechanically couple the second set of touch electrodes and can comprise a second serpentine routing pattern, different from the first serpentine routing pattern, including at least partially traversing the gaps between the plurality of electrodes and routing across at least one touch electrode of the first set of touch electrodes.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
a plurality of touch electrodes, including a first touch electrode, a second touch electrode, and a third touch electrode adjacent to the first touch electrode; and
a first electrode connector electrically coupling the first touch electrode and the second touch electrode and not the third touch electrode, wherein a shape of the first electrode connector is configured to allow the first touch electrode and the second touch electrode to move closer together and farther away from each other while maintaining the electrical coupling between the first touch electrode and the second touch electrode, wherein a first portion of the first electrode connector at least partially extends into a space between the first touch electrode and the third touch electrode, including a first section of the first portion that extends in a first direction and a second section of the first portion that extends in a second direction, opposite of the first direction.

2. The touch sensor panel of claim 1, wherein:
the touch sensor panel is flexible.

3. The touch sensor panel of claim 1, wherein:
the plurality of touch electrodes include a first set of touch electrodes arranged in a row and a second set of touch electrodes arranged in a column.

4. The touch sensor panel of claim 3, wherein:
each touch electrode of the first set of touch electrodes arranged in a row are electrically coupled to an adjacent touch electrode of the first set of touch electrodes via one or more respective electrode connectors, wherein the shape of the one or more respective electrode connectors is configured to allow a respective touch electrode and the adjacent touch electrode to move closer together and farther away from each other while maintaining the electrical coupling between the respective touch electrode and the adjacent touch electrode; and
each touch electrode of the second set of touch electrodes arranged in a column are electrically coupled to an adjacent touch electrode of the second set of touch electrodes via one or more given electrode connectors, wherein the shape of the one or more given electrode connectors is configured to allow a given touch electrode and the adjacent touch electrode to move closer together and farther away from each other while maintaining the electrical coupling between the given touch electrode and the adjacent touch electrode.

5. The touch sensor panel of claim 1, wherein:
the plurality of touch electrodes is configured to measure a capacitance between adjacent touch electrodes.

6. The touch sensor panel of claim 1, wherein:
the shape of the first electrode connector includes a second section of the first electrode connector that routes diagonally away from the first touch electrode coupled to a third section of the first electrode connector that routes diagonally towards the first touch electrode.

7. The touch sensor panel of claim 1, wherein:
the shape of the first electrode connector includes a second section of the first electrode connector that routes diagonally away from the second touch electrode coupled to a third section of the first electrode connector that routes diagonally towards the second touch electrode.

8. The touch sensor panel of claim 1, wherein:
the shape of the first electrode connector includes a second section, coupled to the first touch electrode, that routes parallel to an edge of the first touch electrode.

9. The touch sensor panel of claim 1, wherein:
the shape of the first electrode connector includes a second section, coupled to the second touch electrode, that routes parallel to an edge of the second touch electrode.

10. The touch sensor panel of claim 1, wherein:
the shape of the first electrode connector includes a second section that routes across a fourth touch electrode without electrically coupling with the fourth touch electrode.

11. The touch sensor panel of claim 10, wherein:
the second section of the first electrode connector that routes across the fourth touch electrode is routed in a layer of the touch sensor panel different from a layer in which the fourth touch electrode is formed.

12. The touch sensor panel of claim 1, further comprising:
a second electrode connector electrically coupling the first touch electrode and the second touch electrode in parallel with the first electrode connector, wherein a shape of the second electrode connector is configured to allow the first touch electrode and the second touch electrode to move closer together and farther away from each other while maintaining the electrical coupling between the first touch electrode and the second touch electrode.

13. The touch sensor panel of claim 1, wherein:
the touch sensor panel comprises a plurality of layers;
the plurality of touch electrodes are patterned on a first layer of the plurality of layers; and
at least a portion of the first electrode connector is patterned on a second layer, different from the first layer, of the plurality of layers.

14. The touch sensor panel of claim 1, wherein:
the touch sensor panel comprises a plurality of layers;
the plurality of touch electrodes are patterned on a first layer of the plurality of layers; and
at least a portion of the first electrode connector is patterned on the first layer of the plurality of layers.

15. A device comprising:
the touch sensor panel of claim 1; and
an LED panel, including a plurality of LEDs, formed below the touch sensor panel.

16. The touch sensor panel of claim 1, wherein:
one or more touch electrodes of the plurality of touch electrodes include a gap configured to allow light to pass through the gap.

17. The touch sensor panel of claim 16, wherein:
the shape of the first electrode connector is further configured to route across one of the one of more touch electrodes within an area of the one of the one or more touch electrodes without blocking the gap in the one of the one or more touch electrodes.

18. A device comprising:
the touch sensor panel of claim 1; and
one or more waveguide layers formed above the touch sensor panel, wherein the waveguide layers include one or more etches configured to refract light.

19. The touch sensor panel of claim 1, wherein:
the plurality of touch electrodes includes a first set of touch electrodes arranged in a row and a second set of touch electrodes arranged in a column; and
wherein:
 a first set of electrode connectors electrically couples the first set of touch electrodes and comprises a first serpentine routing pattern including traversing the gaps between the plurality of electrodes; and
 a second set of electrodes connectors electrically couples the second set of touch electrodes and comprises a second serpentine routing pattern, different from the first serpentine routing pattern, including at least partially traversing the gaps between the plurality of electrodes and routing across at least one touch electrode of the first set of touch electrodes.

20. The touch sensor panel of claim 1, wherein:
the touch sensor panel is formed within a flexible material.

21. The touch sensor panel of claim 20, wherein:
the flexible material forms at least a part of a strap of a wearable device.

22. A touch sensor panel comprising:
a plurality of individually-addressable touch electrodes, including a first touch electrode electrically coupled to a first electrical connector configured to be coupled to sense circuitry, a second touch electrode electrically coupled to a second electrical connector configured to be coupled to sense circuitry, and a third touch electrode adjacent to the first touch electrode; and
a first mechanical electrode connector mechanically coupling the first touch electrode and the second touch electrode and not the third touch electrode, wherein a shape of the first mechanical electrode connector is configured to allow the first touch electrode and the second touch electrode to move towards and farther away from each other while maintaining the mechanical coupling between the first touch electrode and the second touch electrode, wherein a first portion of the first electrode connector at least partially extends into a space between the first touch electrode and the third touch electrode, including a first section of the first portion that extends in a first direction and a second section of the first portion that extends in a second direction, opposite of the first direction.

23. The touch sensor panel of claim 22, wherein:
the shape of the first mechanical electrode connector includes:
 a third section, mechanically coupled to the first touch electrode, that routes parallel to an edge of the first touch electrode and diagonally away from the second touch electrode;
 a fourth section, mechanically coupled to the third section, that routes parallel to the edge of the first touch electrode and diagonally towards the second touch electrode;
a fifth section, mechanically coupled to the fourth section, that routes parallel to an edge of the second electrode and diagonally away from the first touch electrode; and
a sixth section, mechanically coupled to the fifth section and the second touch electrode, that routes parallel to the edge of the second electrode and diagonally towards the first touch electrode.

24. The touch sensor panel of claim 22, wherein:
the plurality of individually-addressable touch electrodes includes a first set of touch electrodes arranged in a row and a second set of touch electrodes arranged in a column;
wherein:
 a first set of electrode connectors mechanically couples the first set of touch electrodes and comprises a first serpentine routing pattern including traversing the gaps between the plurality of electrodes; and
 a second set of electrodes connectors mechanically couples the second set of touch electrodes and comprises a second serpentine routing pattern, different from the first serpentine routing pattern, including at least partially traversing the gaps between the plurality of electrodes and routing across at least one touch electrode of the first set of touch electrodes.

25. A method of fabricating a touch sensor panel comprising:
forming a plurality of touch electrodes, including a first touch electrode, a second touch electrode, and a third touch electrode adjacent to the first touch electrode; and
forming a first electrode connector electrically coupling the first touch electrode and the second touch electrode and not the third touch electrode, wherein a shape of the first electrode connector is configured to allow the first touch electrode and the second touch electrode to move closer together and farther away from each other while maintaining the electrical coupling between the first touch electrode and the second touch electrode, wherein a first portion of the first electrode connector at least partially extends into a space between the first touch electrode and the third touch electrode, including a first section of the first portion that extends in a first direction and a second section of the first portion that extends in a second direction, opposite of the first direction.

* * * * *